United States Patent [19]

Terasawa et al.

[11] Patent Number: 5,559,921

[45] Date of Patent: Sep. 24, 1996

[54] SINGLE MODE OPTICAL FIBER

[75] Inventors: Yoshiaki Terasawa; Yuji Kubo, both of Kanagawa, Japan

[73] Assignee: Sumitomo Electric Industries, Ltd., Osaka, Japan

[21] Appl. No.: 478,089

[22] Filed: Jun. 7, 1995

[30] Foreign Application Priority Data

Jun. 24, 1994 [JP] Japan .................. 6-143036
Dec. 12, 1994 [JP] Japan .................. 6-307270

[51] Int. Cl.$^6$ .................. G02B 6/02; G02B 6/18
[52] U.S. Cl. .................. 385/124
[58] Field of Search .................. 385/123–127, 385/147; 359/341, 343; 65/398, DIG. 16

[56] References Cited

U.S. PATENT DOCUMENTS

| | | | |
|---|---|---|---|
| 4,629,485 | 12/1986 | Berkey | 65/398 |
| 4,715,679 | 12/1987 | Bhagavatula | 385/127 |
| 4,822,399 | 4/1989 | Kanamori et al. | 65/398 |
| 4,877,304 | 10/1989 | Bhagavatula et al. | 385/124 |
| 4,889,404 | 12/1989 | Bhagavatula et al. | 359/124 |
| 5,251,062 | 10/1993 | Snitzer et al. | 359/341 |
| 5,278,931 | 1/1994 | Antos et al. | 385/126 |

FOREIGN PATENT DOCUMENTS

| | | |
|---|---|---|
| 0327702 | 8/1989 | European Pat. Off. . |
| 2586823 | 3/1987 | France . |
| 2035601 | 6/1980 | United Kingdom . |

OTHER PUBLICATIONS

Abiru et al, "Dispersion–Shifted Fibers with Gaussian–Step Profile", Proc. Of Optical Fiber Communication Conference '87, Jan. 19, 1987–Jan. 22, 1987, p. 42.
Patent Abstracts Of Japan, vol. 012, No. 180 (P–709), May 27, 1988 & JP–A–62 291605 (Sumitomo Electric Ind Ltd), Dec. 18, 1987.
Patent Abstracts Of Japan, vol. 12, No. 6 (P–653), Jan. 9, 1988 & JP–A–62 165608 (Fujitsu), Jul. 22, 1987.

*Primary Examiner*—Akm E. Ullah
*Attorney, Agent, or Firm*—Cushman Darby & Cushman, L.L.P.

[57] ABSTRACT

A single mode optical fiber of the present invention includes an inner core portion having a diameter of $2a$ and a refractive index $n_1$, an outer core portion having a diameter of $2b$ and a refractive index $n_2$ which is smaller than the refractive index $n_1$ of the inner core portion, the outer core being disposed around the inner core, a clad portion disposed around the outer core portion having a refractive index $n_0$. The single mode optical fiber satisfies relations of: $0.70\% \leq \Delta n_1 \leq 1.2\%$, $0.12 \leq \Delta n_2/\Delta n_1 \leq 0.16$, and $0.15 \leq 2a/2b \leq 0.25$; $0.70\% \leq \Delta n_1 \leq 0.85\%$, $0.06 \leq \Delta n_2/\Delta n_1 \leq 0.12$, and $0.20 \leq 2a/2b \leq 0.28$; or $\Delta n_1 \leq 0.7\%$, $0.06 \leq \Delta n_2/\Delta n_1 \leq 0.16$, and $0.15 \leq 2a/2b \leq 0.3$; where $\Delta n_1 = (n_1^2 - n_0^2)/n_1^2$, and $\Delta n_2 = (n_2^2 - n_0^2)/n_2^2$.

15 Claims, 16 Drawing Sheets

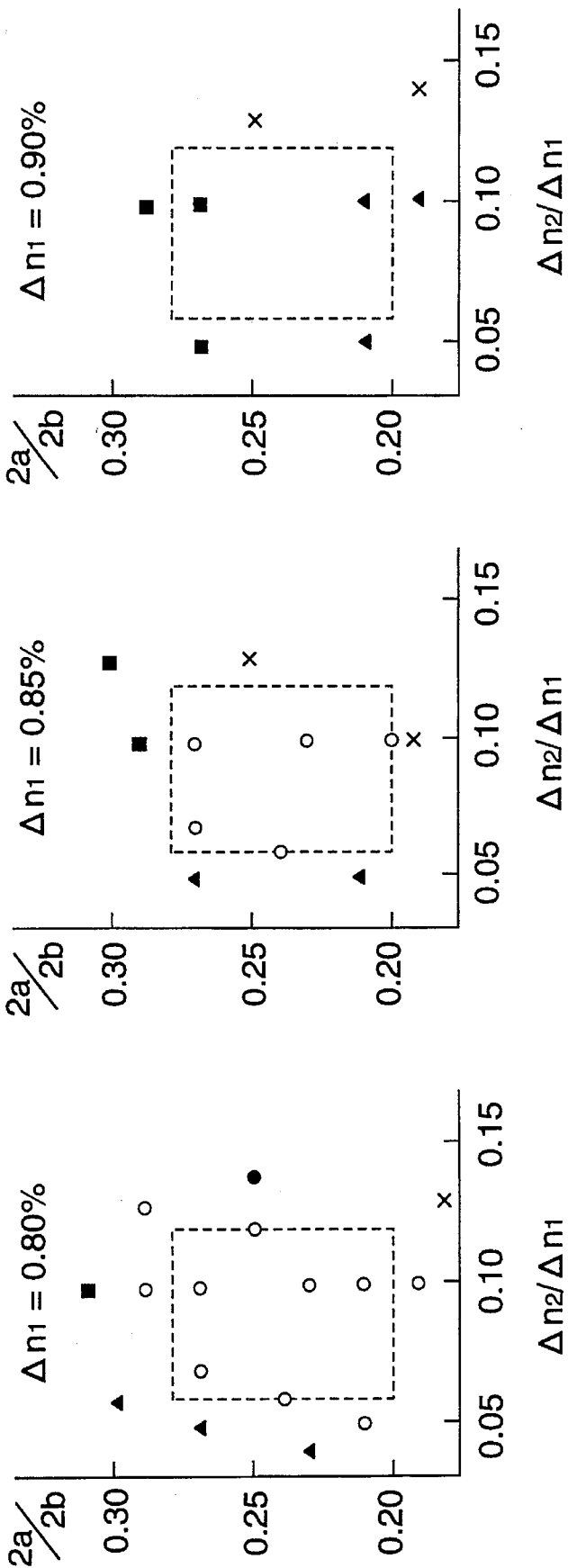

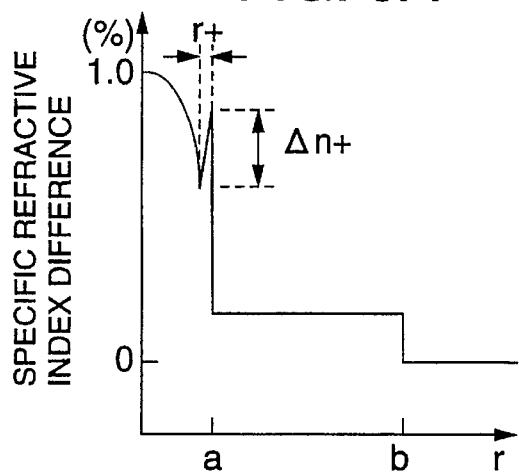
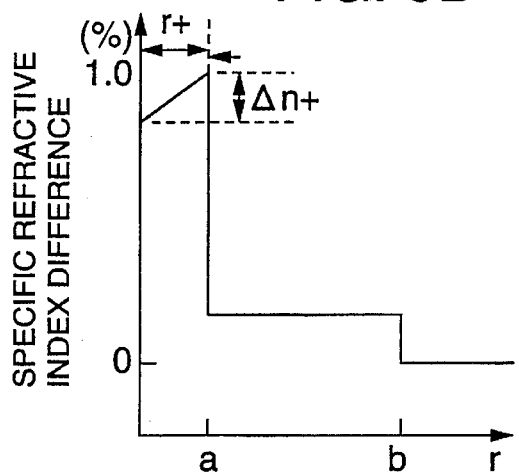
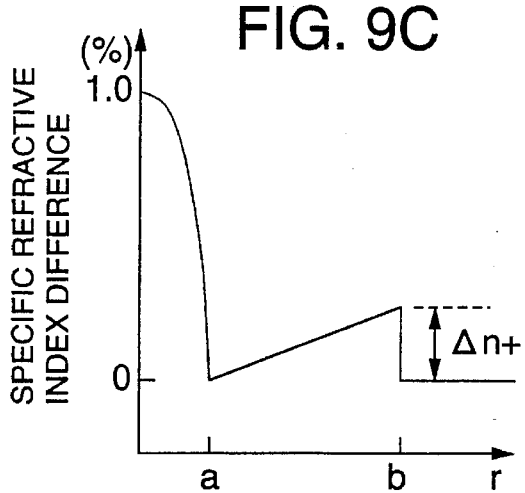
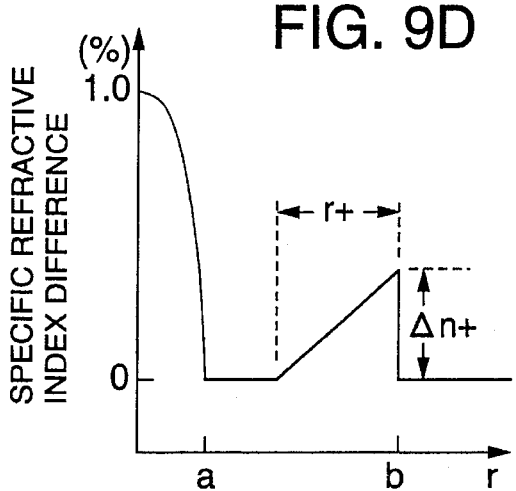
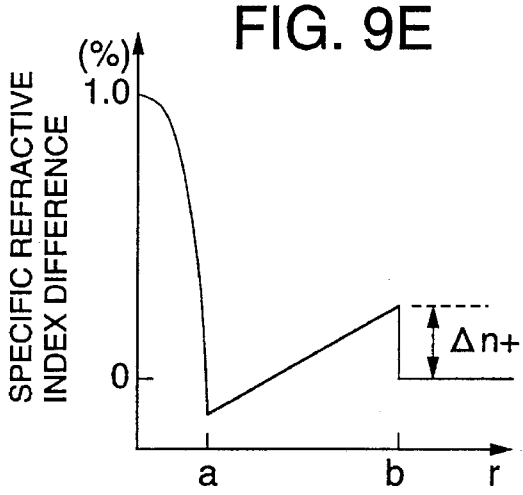
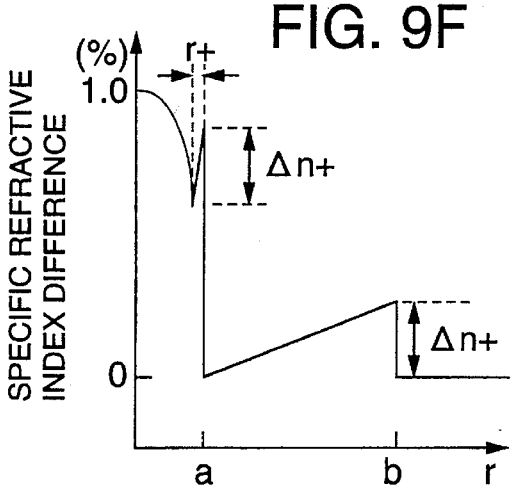

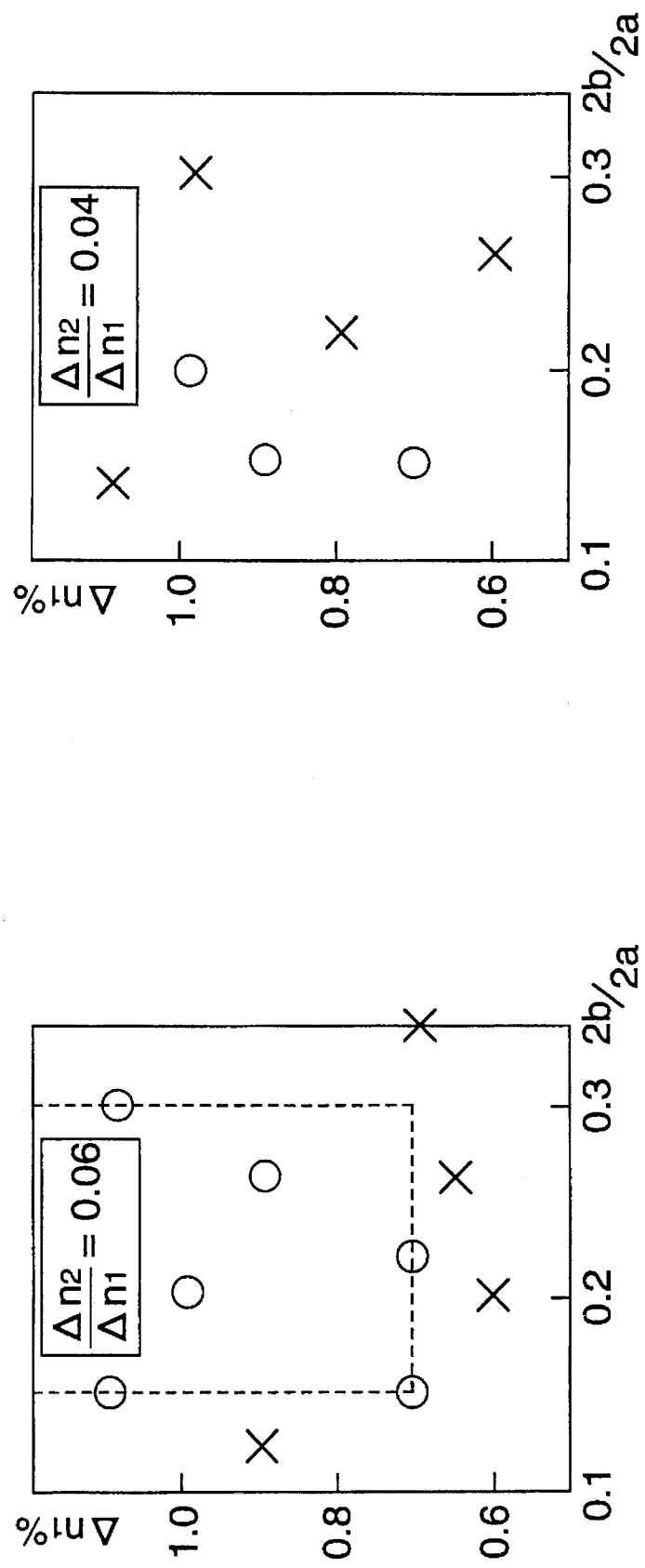

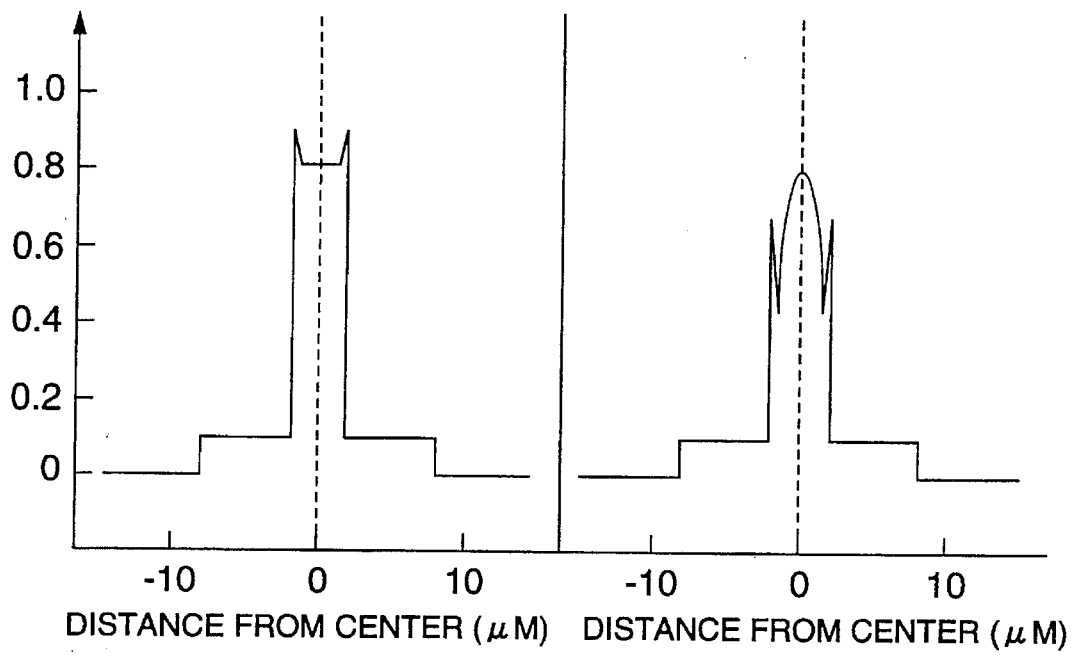

SINGLE MODE OPTICAL FIBER

BACKGROUND OF THE INVENTION

1. Field of the Invention

The present invention relates to a single mode optical fiber and, particularly, relates to a single mode optical fiber adapted for use in a high-speed digital transmission line.

2. Description of the Conventional Art

Conventional single mode optical fibers for communication (hereinafter referred as "SM optical fibers") are in most cases used at a wavelength of about 1.3 μm or about 1.55 μm, The use at the wavelength of about 1.55 μm, however, has increased from the point of view of small loss. As for the refractive index distribution (hereinafter referred to as "profile") of the SM optical fiver adapted for this wavelength 1.55 μm, there is an SM optical fiber comprised of an inner core having a high refractive index, an outer core having a lower refractive index than the refractive index of the inner core, and a clad having a lower refractive index than the refractive index of the outer core, as disclosed in Examined Japanese Patent Publication No. Hei-3-18161.

As described in the paper "1.55 μm dispersion shift fiber", Fujikura Technical Report, pp. 1–7, No. 74, in such a conventional SM optical fiber, it has been considered suitably that the profile has the relations:

$\Delta n_1 = 0.6\%$, $\Delta n_2/\Delta n_1 < 0.17$, and $2a/2b = 0.25$ to $0.33$ where the relative refractive index difference of the inner core with respect to the clad is represented $\Delta n_1$, the relative refractive index difference of the outer core with respect to the clad is represented by $\Delta n_2$, the diameter of the inner core is 2a, and the diameter of the outer core is represented by 2b.

Further, the specific refractive index of the inner core $\Delta n_1$ and the specific refractive index of the outer core $\Delta n_2$ are expressed as follows:

$\Delta n_1 = (n_1^2 - n_0^2)$ and $\Delta n_2 = (n_2^2 - n_0^2)/2\, n_2^2$

In Unexamined Japanese Patent Publication No. Sho-62-291605, it has been made suitable to have the relations:

$\Delta n_2/\Delta n_1\, 0.1 \text{--} 0.4$, and $2a/2b = 0.3 \text{--} 0.6$.

In the conventional art described in these literatures, in view of the reduction of the bending loss of light, the refractive index of the inner core is constant or decreases uniformly from the center of the inner core toward the outer core. However, since the optical fiber is used for short distance transmission or relay transmission, it is possible to neglect the dispersion of light pulses due to a nonlinear effect. Accordingly, the requests to enlarge mode field diameter (MFD) and to reduce the dispersion slope, as will be described later, are not so severe.

If the density of light power in the optical fiber increases in the case where relayless long-distance transmission is to be performed by using optical amplifiers, the spread (dispersion) of light pulses due to a nonlinear effect cannot be neglected. It is therefore necessary to reduce the light power density, but because the reduction of the total quantity of light power for this purpose brings an disadvantage such as increase of bit error or the like, it is effective to widen the light power distribution in the sectional direction of the optical fiber.

The diameter of the light power distribution, that is, the diameter in which light power becomes 1/e as much as the center (maximum) of light power, is called MFD (Mode Field Diameter). Accordingly, widening the light power distribution in the sectional direction of the optical fiber causes another problem to increase MFD.

In addition, digital transmission is also being proceeded at a high speed in accordance with the introduction of light amplifiers. In such a high-speed digital transmission line, the distance between light pulses is so small that there also arises a problem in which the width of the light pulses is expanded by the wavelength fluctuation of light emitted from a light source if the dispersion slope of an SM fiber used there is large.

Generally, light having a plurality of wavelengths is ordinarily emitted from the light source. Indeed dispersion does not occur since a plurality of light beams of the respective wavelengths are propagated at almost an equal speed. However, the propagation speed in the SM fiber depends on wavelength, so that dispersion occurs when the central wavelength gets out of zero-dispersion wavelength due to the wavelength fluctuation of the emitted light. The size of this dispersion takes a negative value when the wavelength is shorter than the zero-dispersion wavelength, and takes a positive value when the wavelength is longer than the zero-dispersion wavelength. The size of the dispersion relative to the wavelength changes in an approximately straight line near the zero-dispersion wavelength. When the dispersion slop, which means the inclination of wavelength dispersion in the zero-dispersion wavelength, is small, the size of the dispersion is small even in the position which is apart from the zero-dispersion wavelength.

In a conventional 1.55 μm SM optical fiber profile, at least one of dispersion slope and bending loss is increased when MFD is increased, so that the expansion of the MFD and the reduction of the dispersion slope cannot be compatible with each other. Therefore, there has been a problem on practical use.

For example, while 20 mmφ bending loss is not more than 1 dB when MFD is in the normal region of 7.5 to 8.0 μmφ, it takes 20 dB or more when 9.0 μmφ. The MFD had better be increased in order to restrain the dispersion caused by nonlinear effects. However, if the 20 mmφ bending loss is above 20 dB consequently, the possibility to increase the loss in making the fiber into a cable is so high as to cause a problem on practical use.

In a conventional profile, assume that zero-dispersion wavelength is fixed into a predetermined wavelength near 1.55 μm, bending loss satisfies the relation 20 mmφ bending loss $\leq 1$ dB/m as well as conventional one, and cutoff wavelength is set to not more than operating wavelength. In order to increase MFD, it is necessary to reduce relative refractive index difference $\Delta n_1$ of an inner core, and increase diameter 2b of an outer core. However, dispersion slope increases then. For example, if the MFD is increased from 7.5 μmφ to 8.0 μmφ when the zero-dispersion wavelength is 1.56 μm, the dispersion slope is changed from 0.06 ps/nm²/km or more to 0.075 ps/nm²/km or more, so that the lower limit is increased. Therefore, there is a disadvantage with respect to the wavelength fluctuation of a light source.

Further, it is necessary that the zero-dispersion wavelength is set to be longer than the used wavelength in order to prevent the mixture of four light waves in the case where an optical amplifier is used, and it is therefore necessary that the ratio $\Delta n_2/\Delta n_1$, that is, the ratio of the average value $\Delta n_2$ of the relative refractive index difference of the outer core to the average value $\Delta n_1$ of the relative refractive index difference of the inner core is set to be smaller, so that increase of bending loss arises from this point of view to thereby bring a disadvantage in the conventional profile.

SUMMARY OF THE INVENTION

It is an object of the present invention to provide a single mode optical fiber in which the zero-dispersion wavelength is set to be longer so that the MFD can be increased without increase of bending loss to thereby make it possible to reduce the dispersion due to the nonlinear effect.

It is another object of the present invention to provide a single mode optical fiber in which it is also possible to reduce the dispersion slope of such dispersion.

A single mode optical fiber of the present invention includes an inner core portion having a diameter of 2a and a refractive index $n_1$, an outer core portion having a diameter of 2b and a refractive index $n_2$ which is smaller than the refractive index $n_1$ of the inner core portion, the outer core being disposed around the inner core, a clad portion disposed around the outer core portion having a refractive index $n_0$. The single mode optical fiber satisfies relations of: $0.70\% \leq \Delta n_1 \leq 1.2\%$, $0.12 \leq \Delta n_2/\Delta n_1 \leq 0.16$, and $0.15 \leq 2a/2b \leq 0.25$; $0.70\% \leq \Delta n_1 \leq 0.85\%$, $0.06 \leq \Delta n_2/\Delta n_1 \leq 0.12$, and $0.20 \leq 2a/2b \leq 0.28$; or $\Delta n_1 \geq 0.7\%$, $0.06 \leq \Delta n_2/\Delta n_1 \leq 0.16$, and $0.15 \leq 2a/2b \leq 0.3$; where $\Delta n_1 = (n_1^2 - n_0^2)/n_1^2$, and $\Delta n_2 = (n_2^2 - n_0^2)/n_2^2$.

According to the present invention, it is possible to elongate zero-dispersion wavelength, and it is hence possible to increase MFD from the conventional average 7.5 μm to 8.0 μm or more or 9.0 μm without increasing bending loss. It is therefore possible to prevent light pulses from being expanded by nonlinear effects.

A single mode optical fiber with this profile can reduce dispersion caused by nonlinear effects without deteriorating any other transmission characteristic, so as to reduce the distortion of light signal pulses effectively as a single mode optical fiber for long distance transmission without any junction.

BRIEF DESCRIPTION OF THE DRAWINGS

In the accompanying drawings;

FIGS. 5A to 5F are third diagrams showing the results of measurement of the prototypical single mode optical fibers;

FIGS. 9A to 9F are diagrams illustrating a fourth profile;

FIGS. 13A to 13E are diagrams illustrating measurement results of prototype single mode optical fibers in example 7;

FIGS. 14A and 14B are diagrams illustrating distribution of refractive index applied to a single mode optical fiber according to the present invention in example 7; and FIG. 15 shows transmission characteristics in the case of adopting the profiles of FIGS. 2B and 14B.

DETAILED DESCRIPTION OF THE INVENTION

The detailed description of the present invention will be described as follows referring to the accompanying drawings.

Figure 1:
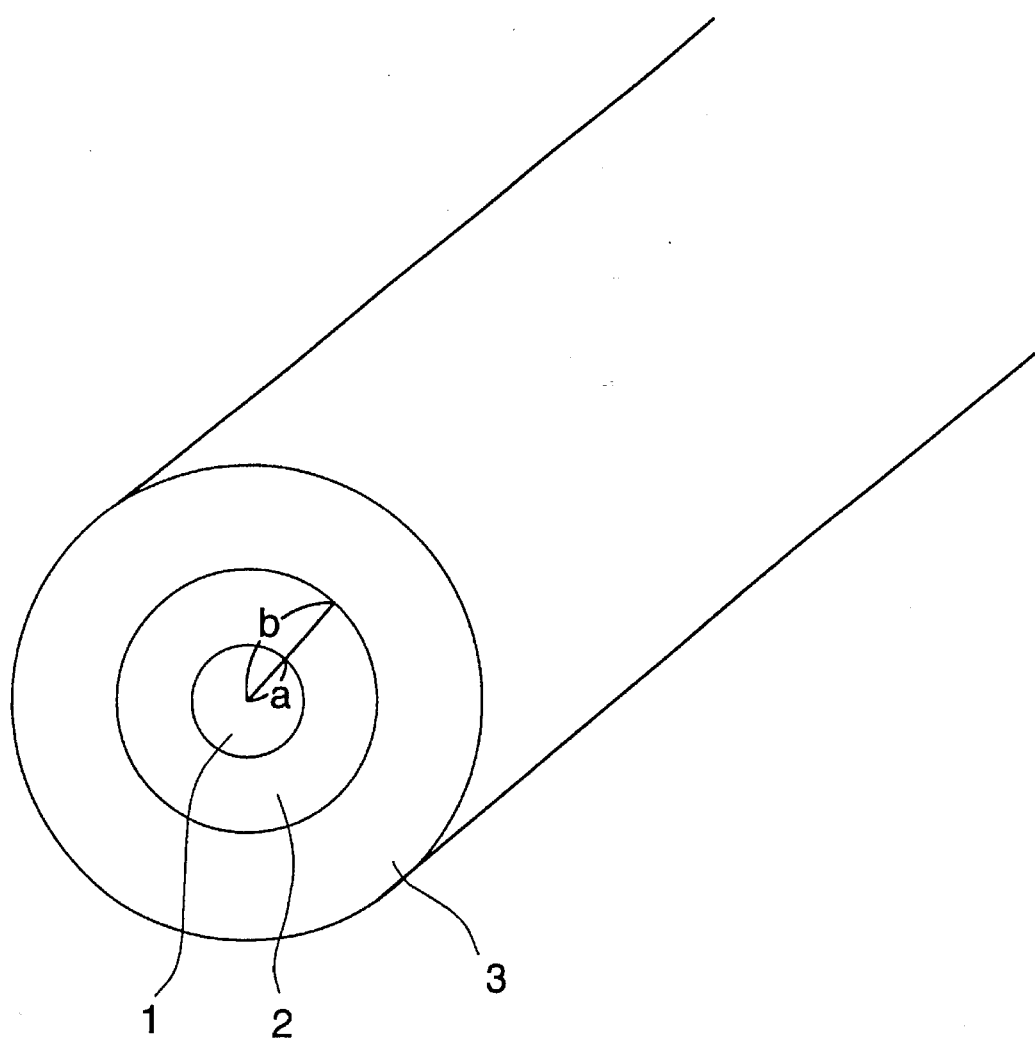
FIG. 1 is a sectional view showing a single mode optical fiber according to the present invention.

A single mode optical fiber of the present invention includes an inner core 1, an outer core 2 and a glad portion 3 as shown in FIG. 1. The inner core 1 has a diameter of 2a and an average relative refractive index difference of $\Delta n_1$ based on a refractive index $n_0$ of a clad portion. The outer core 2 disposed outside the inner core and having a diameter of 2b and an average relative refractive index difference of $\Delta n_2$ based on the refractive index $n_0$ of the clad portion and lower than the relative refractive index difference of the inner core. That is, the refractive index $n_1$ of the inner core is larger than the refractive index $n_2$ of the outer core. The single mode optical fiber of the present invention satisfies the relations of 1) $0.70\% \leq \Delta n_1 \leq 1.2\%$, $0.12 \leq \Delta n_2/\Delta n_1 \leq 0.16$, and $0.15 \leq 2a/2b \leq 0.25$, or 2) $0.70\% \leq \Delta n_1 \leq 0.85\%$, $0.06 \leq \Delta n_2/\Delta n_1 \leq 0.12$, and $0.20 \leq 2a/2b \leq 0.28$, where $\Delta n_1 = (n_1^2 - n_0^2)/n_1^2$, and $\Delta n_2 = (n_2^2 - n_0^2)/n_2^2$.

In the above single mode optical fiber, the MFD can be increased without increase of bending loss by increasing the average value $\Delta n_1$ of the relative refractive index difference of the inner core and reducing the ratio 2a/2b, that is, the ratio of the diameter 2a of the inner core to the diameter 2b of the outer core. At this time, for example, in the condition of MFD=9.0 μmφ, the 20 mmφ bending loss is 5 dB or less, which is about 25% of the conventional one.

On the assumption that the zero-dispersion wavelength and the MFD take constant values respectively, bending loss is reduced by increasing the average value $\Delta n_1$ of the relative refractive index difference of the inner core in the condition in which $\Delta n_2/\Delta n_1$, that is, the ratio of the average value $\Delta n_2$ of the relative refractive index difference of the outer core to the average value $\Delta n_1$ of the relative refractive index difference of the inner core, is in a range of from 0.06 to 0.16. This is because structural dispersion is increased to thereby make the zero-dispersion wavelength large when, for example, the quantity of $GeO_2$ with which the core portion is doped is increased in order to increase the average value $\Delta n_1$ of the relative refractive index difference of the inner core, so that the practical zero-dispersion wavelength for one and the same MFD can be shifted to a region small in bending loss.

That is, the wavelength of signal light is set in accordance with the zero-dispersion wavelength in order to reduce dispersion to zero, or made smaller than the zero-dispersion wavelength in order to prevent the mixture of four light waves. With the zero-dispersion wavelength made long, it is possible to elongate the wavelength of the signal light. With the wavelength of the signal light made long, it is possible to reduce the bending loss.

Then, the relative refractive index difference based on the refractive index $n_0$ of the clad changes in accordance with distance r from the center of the optical fiber, and is expressed by:

$$\Delta n(r)=(n(r)^2-n_0^2)/2n(r)^2$$

When the diameter of the inner core is 2a and the diameter of the outer core is 2b, the average value of the relative refractive index difference of the inner core is expressed by:

$$\Delta n_1=\int_0^a n(r)dr/a$$

and the average value of the relative refractive index difference of the outer core is expressed by:

$$\Delta n_2=\int_a^b \Delta n(r)dr/(b-a).$$

However, if the average value $\Delta n_1$ of the relative refractive index difference of the inner core is more than 1.2%, the force to shut light in the core becomes so strong as to increase the MFD, it is not enough only to reduce the ratio 2a/2b of the inner core diameter to the outer core diameter which will be described later. Further, it is therefore necessary to reduce 2b. Therefore, as will be described later, the cutoff wavelength becomes short so that the bending loss becomes large.

When the average value $\Delta n_1$ of the relative refractive index difference of the inner core is increased, however, the dispersion slope showing the change of the dispersion value with respect to the wavelength is increased to narrow the range of the zero-dispersion wavelength permitted to the optical fiber line, whereby the narrowing of the range may become a problem. It is therefore effective to make the average value $\Delta n_1$ of the relative refractive index difference of the inner core to be not larger than 1.2% in order to obtain the practical dispersion slope ($\leq 0.1$ ps/nm²/km).

On the contrary, if the average value $\Delta n_1$ of the relative refractive index difference of the inner core is smaller than 0.7%, the MFD becomes too large. Accordingly, it is necessary to increase the diameter 2b of the outer core which will be described later. However, at that time, the cutoff wavelength is over the light signal wavelength unsuitably. Therefore, a suitable range of the average value $\Delta n_1$ of the relative refractive index difference of the inner core is from 0.7% to 1.2%.

In a conventional profile, the value of the ratio 2a/2b of the inner core diameter with respect to the outer core diameter has been set comparatively large. Accordingly, if the inner core diameter 2a is made small in order to increase the MFD, it is also necessary to reduce the outer core diameter 2b. Then the cutoff wavelength becomes short inevitably. Generally, as the MFD becomes larger, or as the cutoff wavelength becomes shorter, the bending loss increases.

Therefore, in the conventional profile, the bending loss has been increased conspicuously because the increase of the MFD and the reduction of the cutoff wavelength occur at the same time.

In a profile of the present invention, the ratio 2a/2b of the inner core diameter with respect to the outer core diameter is reduced. It is therefore possible to reduce 2a to increase the MFD while the outer core diameter 2b is increased to elongate the cutoff wavelength. That is, it is possible to increase the MFD without increasing the bending loss. Then, even if the cutoff wavelength is elongated thus, the cutoff wavelength must not be over the signal light wavelength established near 1.55 µm.

Therefore, a preferable range of the value of the ratio 2a/2b of the inner core diameter with respect to the outer core diameter is from 0.15 to 0.25, which is smaller than a range of from 0.25 to 0.33 or from 0.3 to 0.6 in the conventional profile.

In order to elongate the cutoff wavelength, the ratio $\Delta n_2/\Delta n_1$ of the average value of the relative refractive index difference of the outer core to the average value of the relative refractive index difference of the inner core may be increased, instead of increasing the outer core diameter 2b. However, in the conventional profile with a large ratio 2a/2b of the inner core diameter to the outer core diameter, when the MFD is set to not less than 9 µmφ, the cutoff wavelength cannot be made enough long only by increasing the ratio $\Delta n_2/\Delta n_1$ of the average value of the relative refractive index difference of the outer core to the average value of the relative refractive index difference of the inner core.

Also in a profile in the present invention, when the MFD is set to not less than 9 µmφ, the lower limit of the ratio $\Delta n_2/\Delta n_1$ of the average value of the relative refractive index difference of the outer core to the average value of the relative refractive index difference of the inner core must be set to 0.12 in order to ensure enough long cutoff wavelength. Since the cutoff wavelength must not be above the signal light wavelength established near 1.55 µm, the upper limit of the ratio $\Delta n_2/\Delta n_1$ must be set to not more than 0.16.

Therefore, a preferable range of the ratio $\Delta n_2/\Delta n_1$ of the average value of the relative refractive index difference of the outer core to the average value of the relative refractive index difference of the inner core is in the range of 0.12 to 0.16.

In addition, in the present invention, the ratio 2a/2b of the inner core diameter to the outer core diameter is set to be smaller than that in a conventional profile, and the region where dispersion slope becomes small in a large MFD is shifted to the neighborhood of 1.55 µm which is a zero-dispersion wavelength, so that the dispersion slope can be reduced even if the MFD is increased. At this time, the dispersion slope becomes not more than 0.070 ps/nm²/km when the MFD is not less than 8.0 µmφ, so that the dispersion slope can be reduced by 8% in comparison with a conventional one.

In the same manner as in a profile according to the conventional art, in the region where the ratio 2a/2b of the inner core diameter to the outer core diameter is large, the dispersion slope becomes large when the MFD is increased. If the value of this ratio 2a/2b of the inner core diameter to the outer core diameter is reduced to not more than 0.28, the region where the dispersion slope becomes small in a large MFD is shifted to the neighborhood of 1.55 µm which is a zero-dispersion wavelength. Therefore, in the neighborhood of the zero-dispersion wavelength 1.55 µm, the dispersion slope can be reduced even if the MFD is increased.

Even when the ratio 2a/2b of the inner core diameter to the outer core diameter is reduced then, it is necessary to increase the outer core diameter 2b so as to keep the inner core diameter 2a almost constant. It is because that if the ratio $\Delta n_2/\Delta n_1$ of the average value of the relative refractive index difference of the outer core to the average value of the relative refractive index difference of the inner core and the inner core diameter 2a are constant, the wavelength dependence of structural dispersion increases to reduce the dispersion slope though the change of the MFD is small. For example, if 2a is kept near 5.25 µm in each 2a/2b with the aim of $\Delta n_1=0.8\%$, MFD=8.0 μm and zero-dispersion wavelength=1,560 nm, the dispersion slope can be reduced to not more than 0.069 ps/nm$^2$/km in 2a/2b≦0.28 though not less than 0.071 ps/nm$^2$/km in 2a/2b>0.28.

In addition, if a region where the relative refractive index difference increases from the center toward the outside is provided in the inner core or the outer core, the dispersion slope can be reduced effectively. In comparison between a profile with an inner core or an outer core including a region where the refractive index increases toward the outside and a profile which does not have such a region in which $\Delta n_1$ as well as 2a/2b are same and also the zero-dispersion wavelength is same, the dispersion slope can be more reduced in the profile having such a region if $\Delta n_2/\Delta n_1$ and 2b are selected so that the MFDs of the both profiles are equal to each other.

As has been described above, the effect obtained by the provision, in the inner or outer core, of the region where the relative refractive index difference increases from the center toward the outside can be applied to a profile according to the prior art, but may be combined with a profile according to aforementioned profile according to the present invention.

Further, if an inner clad where an average value $\Delta n_0'$ of the relative refractive index difference to the refractive index $n_0$ of the clad is negative is provided outside the outer core, it is possible to reduce the dispersion slope on a large scale.

Figure 10:
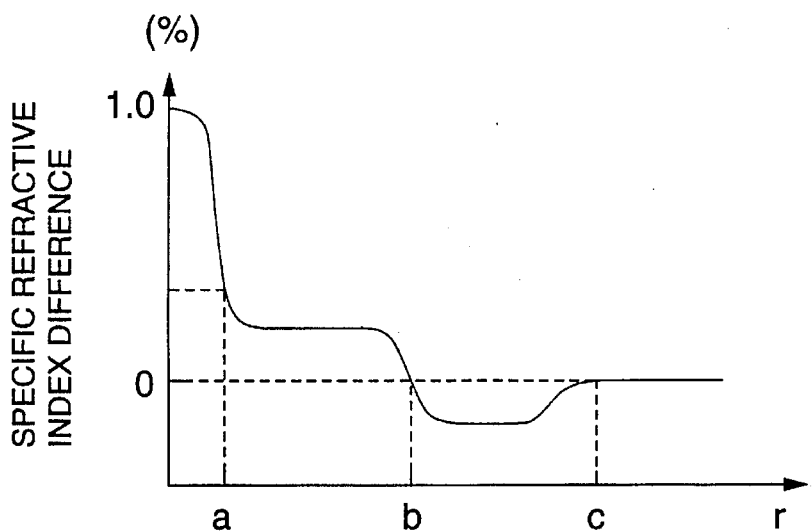
FIG. 10 is a diagram for explaining a profile when an inner clad is provided outside an outer core.

FIG. 10 is a diagram for explaining a profile when an inner clad is provided outside an outer core. In the drawing, the abscissa designates a distance r from the center of an SM fiber, and the ordinate designates a relative refractive index difference $\Delta n(r)$ at the distance r from the center. The relative refractive index difference in a clad takes the reference value 0. The values 2a and 2b designates an inner core diameter and an outer core diameter as described above. Defined more strictly, the position at a distance a from the center is a position where $\Delta n(a)$ is ⅓ as large as the core maximum value $\Delta n(0)$, and the outside of which has $\Delta n(r)$ not larger than this value $\Delta n(a)$. The position at a distance b from the center is a position which has the sharpest inclination of $\Delta n(r)$ to r, and which is between 3.5a and 5.0a when the ratio 2a/2b of the inner core diameter to the outer core diameter is set to 0.2 to 0.28. The value 2c designates the diameter of the inner clad. Defined more strictly, 2c designates a point where $\Delta n_0(r)$ returns to 0 from minus.

If such an inner clad is provided, the structural dispersion is reduced to shift the zero-dispersion wavelength to the short wavelength side. But the shift can be prevented by increasing the inner core diameter 2a. It is the reason of the possibility of such prevention that the structural dispersion increases suddenly to plus if the inner core diameter 2a is increased in the long wavelength region, so that the phenomenon that the material dispersion increases suddenly to minus is compensated in a wide range. However, since the existence of the inner clad causes the increase of the bending loss under the same MFD, there is a limit in the size of the region of this inner clad, and the value of the relative refractive index difference of the inner clad.

Preferably, the size of the region of this inner clad is set in the region $3b \leq 2c \leq 9b$. In addition, preferably the relative refractive index difference of the inner clad is established so that its integral value S defined by the expression $$S = \int_b^c \Delta n(r) dr$$

satisfies the expression $$S \geq -0.06 \text{ μm}.$$

Further, the increase of this bending loss can be restrained by reducing the relative refractive index difference of the inner clad toward the outside. For example, if provided is an inner clad where $\Delta n(r)$ decreases toward the outside in the region which occupies at least ⅓ of the width of the inner clad region and comes to the outside of the inner clad region, the increase of the bending loss becomes small relatively to the decrease of the dispersion slope in spite of the same integral value $S_2 = \int_b^c \Delta n(r) dr$ of the relative refractive index difference of the inner clad. Accordingly the dispersion slope can be reduced under the same bending loss and MFD. For the dispersion slope depends on the integral value $S = \int_b^c \Delta n(r) dr$ of the relative refractive index difference of the - can inner clad while the size of the bending loss depends on the width (c–b) of the inner clad and the depth of $\Delta n(c)$.

EXAMPLE 1

Figure 2A:
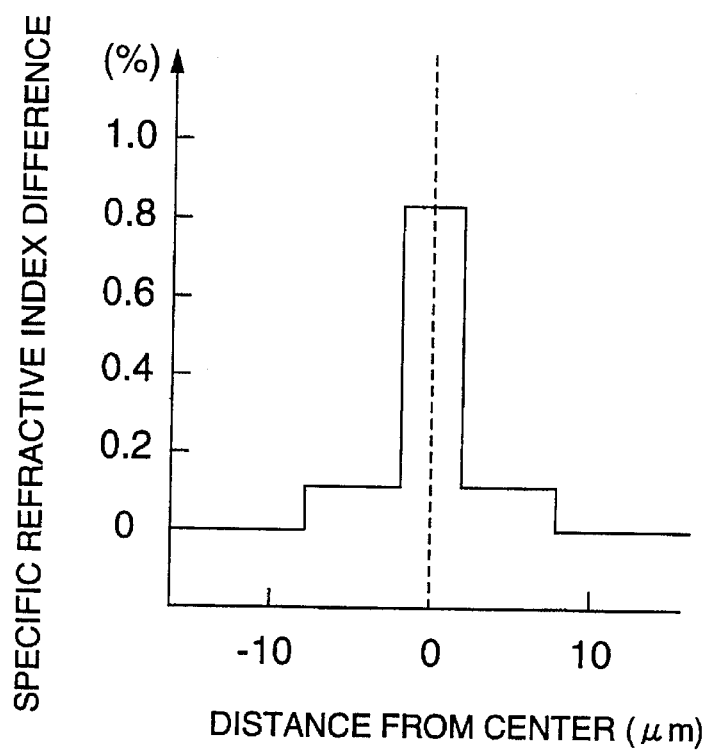
FIGS. 2A and 2B are diagrams showing a first profile, which are distribution of refractive index of a core portion of a conventional single mode optical fiber.
Figure 2B:
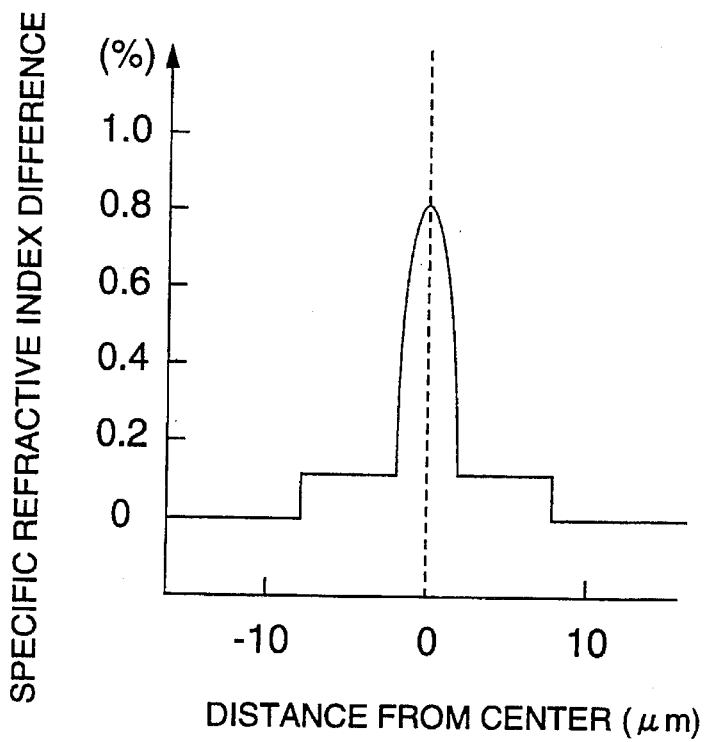
Figure 3A:
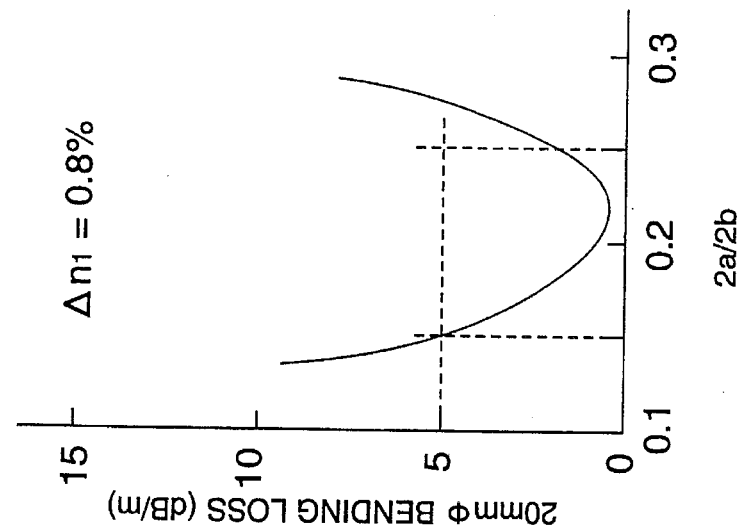
FIGS. 3A to 3F are first diagrams showing the measurement results of the prototypical single mode optical fibers.
Figure 3B:
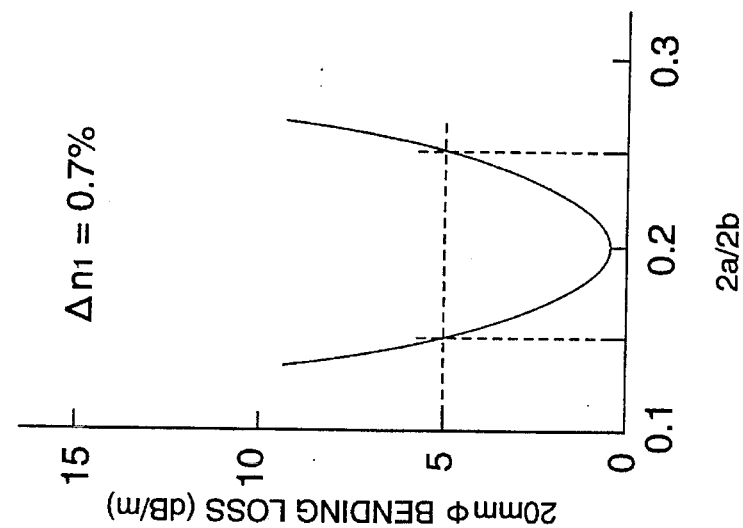
Figure 3C:
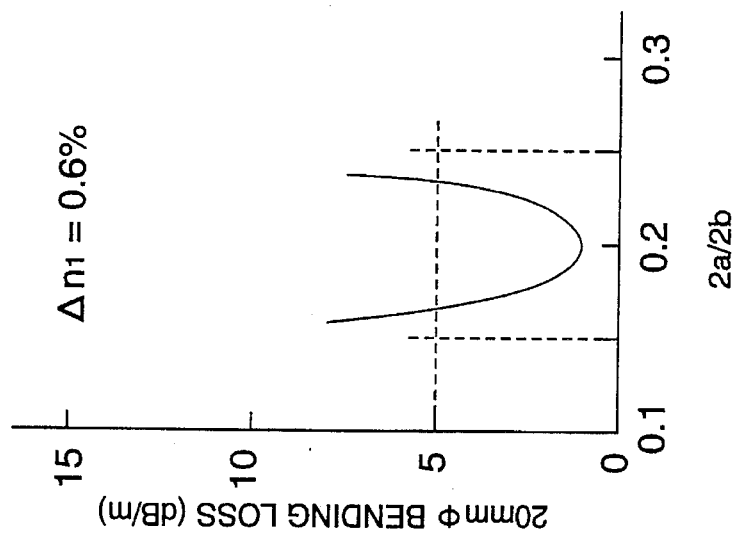
Figure 3F:
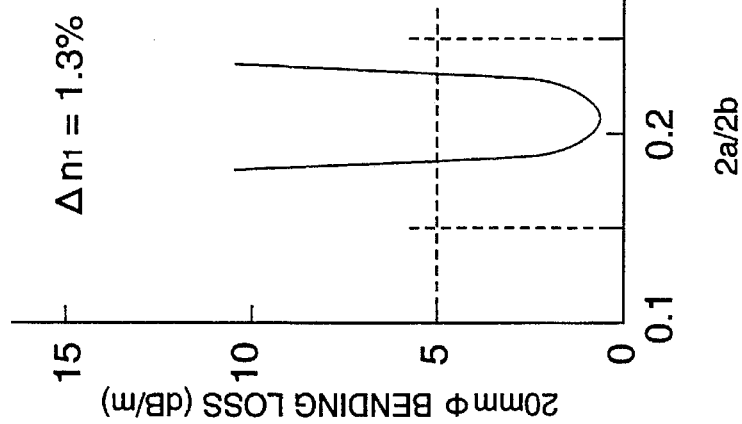
Figure 3E:
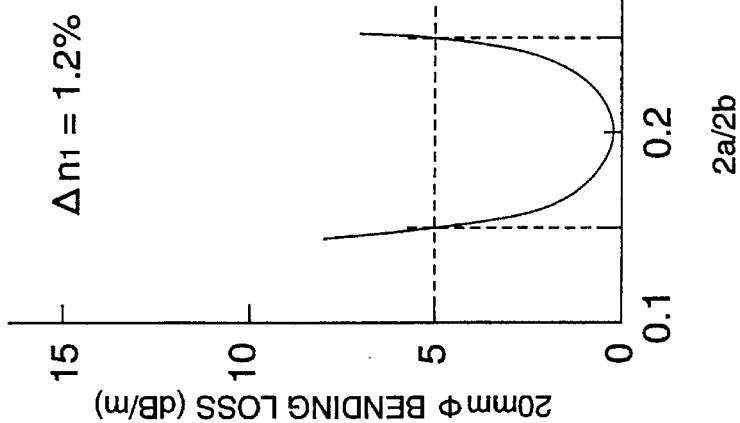
Figure 3D:
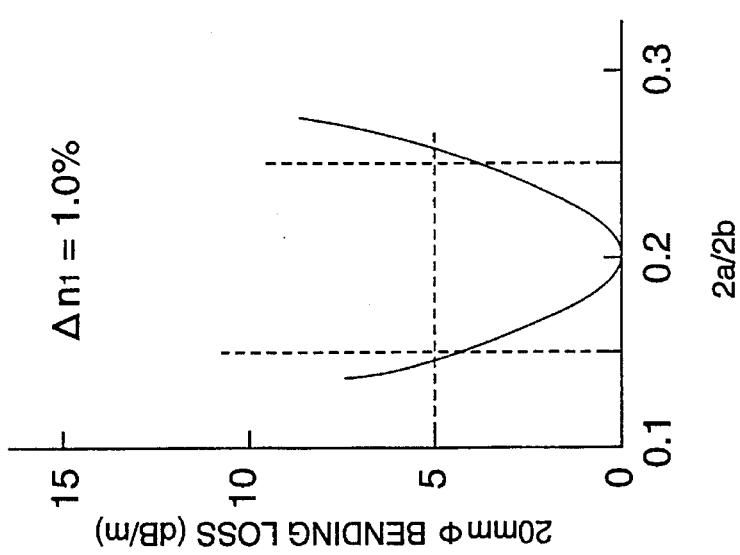

FIGS. 2A and 2B are diagrams illustrating a first profile. In FIG. 1A, the relative refractive index difference of the inner core is constant. In FIG. 1B, the relative refractive index difference of the inner core decreases uniformly from the center toward the inner core. These are similar to the specific refractive index distribution of the conventional single mode optical fiber. Refractive index is constant in the outer core and the clad in each case. The first profile shown in FIGS. 1A and 1B were applied to various kinds of prototypical single mode optical fibers manufactured.

FIGS. 3A to 3F are first diagrams showing the measurement results of the prototypical single mode optical fibers. These diagrams show the value of 20 mmφ bending loss in the case where the 20 mmφ bending loss took the minimum value in each value of the ratio 2a/2b of the inner core diameter to the outer core diameter when measurement was carried out under the condition that the outer core diameter 2b and the ratio $\Delta n_2/\Delta n_1$ of the average value of the relative refractive index difference of the outer core to the average value of the relative refractive index difference of the inner core were selected desirably so as to satisfy the relations:

MFD≧9 μmφ, zero-dispersion wavelength=1560±10 nm, cutoff wavelength≦1500 nm, and 20 mmφ bending loss≦5 dB/m, by use of the average value $\Delta n_1$ of the relative refractive index difference of the inner core as a parameter. Incidentally, the bending loss was measured as a loss which occurred when the optical fiber was bent to form a circular arc with a diameter of 20 mm, and this bending loss was made to be called "20 mmφ bending loss".

From FIGS. 3B, 3C, 3D and 3E, it is understood that the average value $\Delta n_1$ of the relative refractive index difference of the inner core takes 0.7 to 1.2% and the 20 mmφ bending loss becomes not more than 5 dB/m when the ratio 2a/2b of the inner core diameter to the outer core diameter takes 0.15 to 0.25.

FIGS. 4A to 4F are second diagrams showing the results of measurement of the prototypical single mode optical fibers. These diagrams show the value of 20 mmφ bending loss in the case where the 20 mmφ bending loss took the minimum value in each value of the ratio $\Delta n_2/\Delta n_1$ of the average value of the relative refractive index difference of the outer core to the average value of the relative refractive index difference of the inner core when the measurement was carried out under the condition that the outer core diameter 2b was selected desirably so as to satisfy the relations:

MFD≧9 μmφ,

*zero-dispersion wavelength=1560±10 nm, and* cutoff wavelength≦1500 nm by use of the average value $\Delta n_1$ of the relative refractive index difference of the inner core as a parameter in the same manner within the range of 0.15 to 0.25 of the ratio 2a/2b of the inner core diameter to the outer core diameter established by use of FIGS. 2A to 2F described above.

From FIGS. 4B, 4C, 4D and 4E, it is understood that the ratio $\Delta n_2/\Delta n_1$ of the average value of the relative refractive index difference of the outer core to the average value of the relative refractive index difference of the inner core takes 0.12 to 0.16 and the 20 mmφ bending loss becomes not more than 5 dB/m when the average value $\Delta n_1$ of the relative refractive index difference of the inner core takes 0.7 to 1.2%.

Figure 4A:
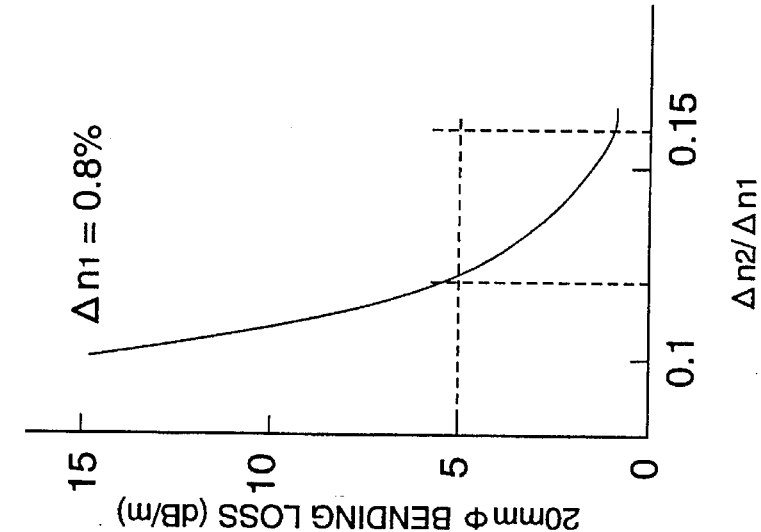
FIGS. 4A to 4F are second diagrams showing the results of measurement of the prototypical single mode optical fibers.
Figure 4B:
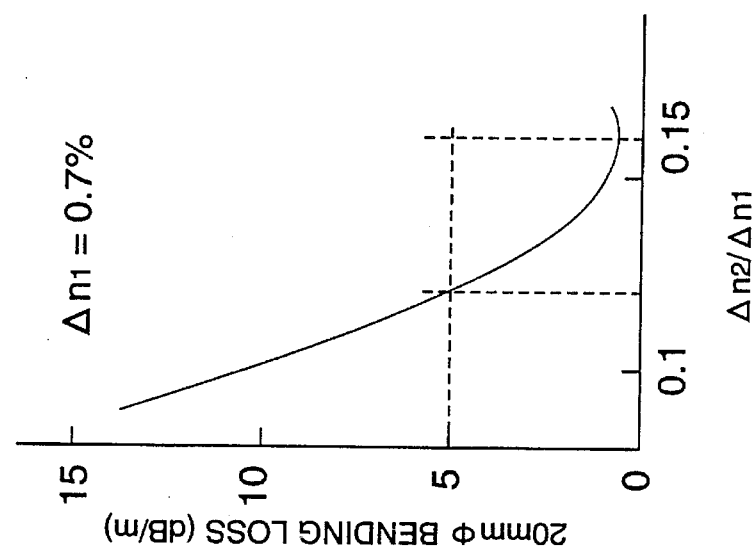
Figure 4C:
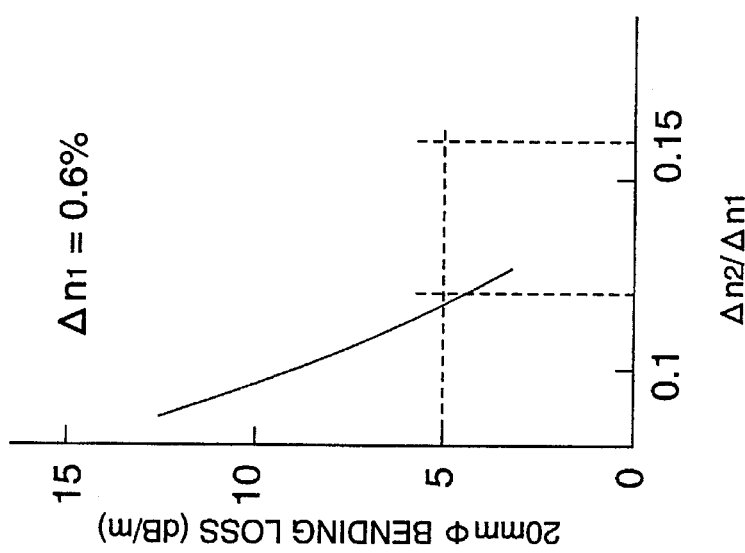
Figure 4F:
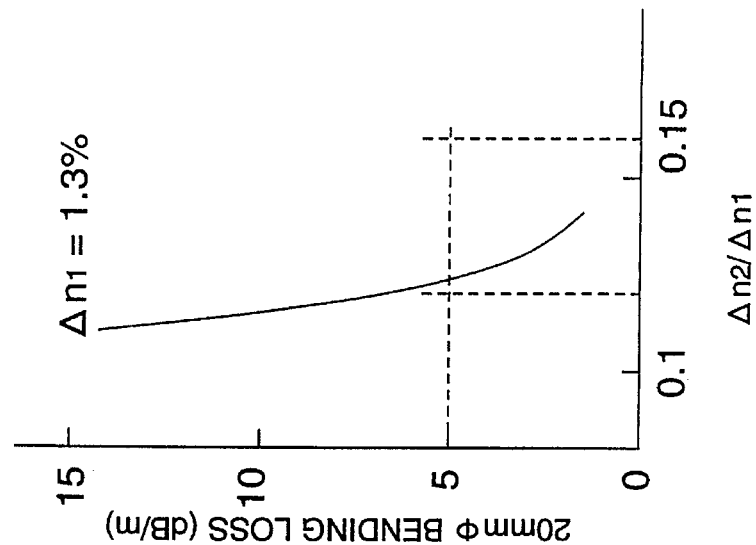
Figure 4E:
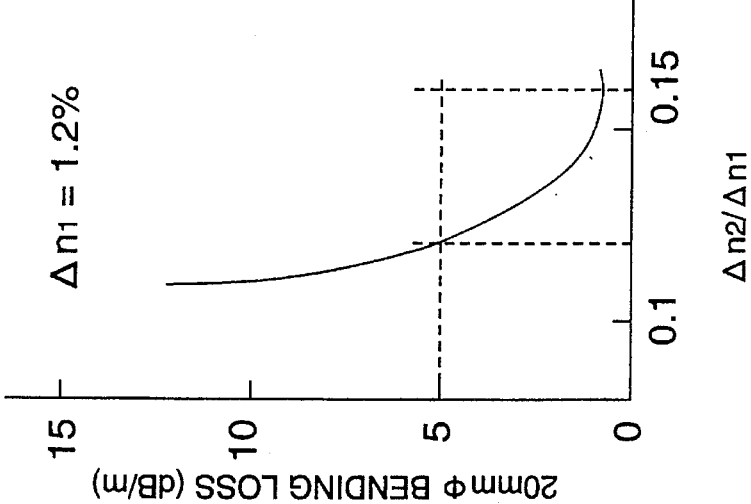
Figure 4D:
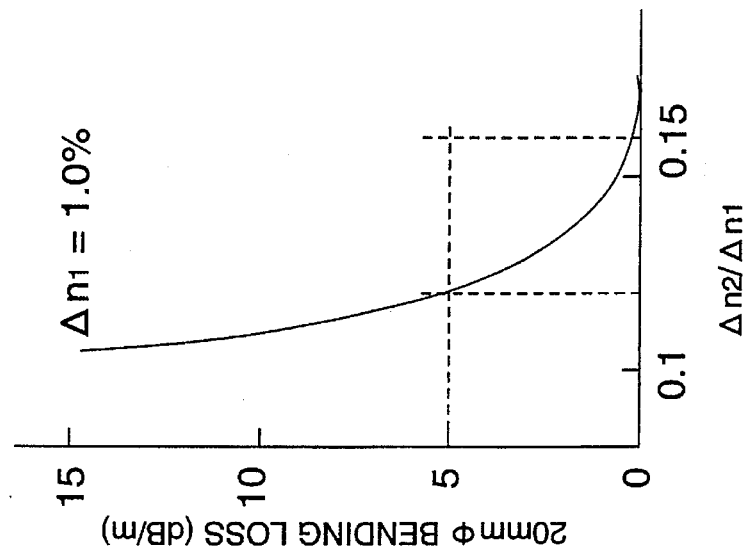
Figure 5A:
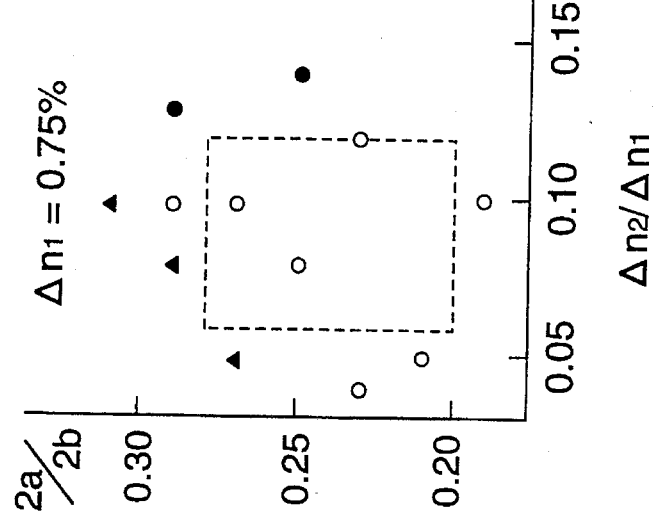
Figure 5B:
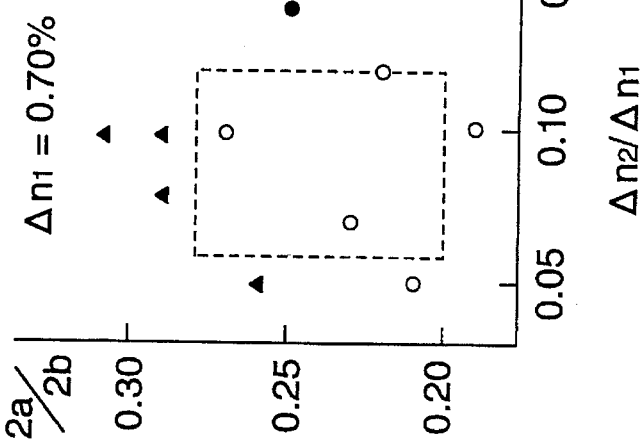
Figure 5C:
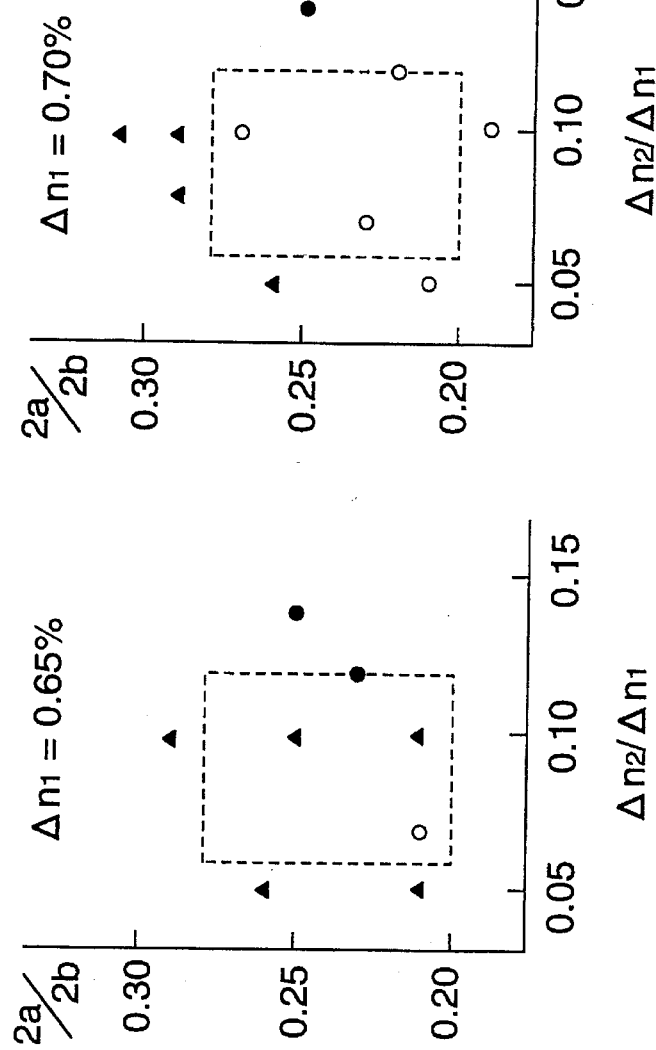

Data in the case where the ratio 2a/2b of the inner core diameter to the outer core diameter is large are not stated in FIGS. 4A and 4E for the reason that if the relations MFD≧9 μmφ and zero-dispersion wavelength=1560±10 nm are set in this region, the cutoff wavelength is above 1,500 nm not to satisfy the given conditions.

Further, in order to define an effective range not to increase the dispersion slope in spite of increasing the MFD, various kinds of prototype single mode optical fibers were manufactured and the characteristics thereof were examined. As for the aforementioned respective characteristic values, measurement results are shown in FIGS. 5A to 5F upon the assumption that the characteristic having the following values:

MFD≧8 μmφ,

*zero-dispersion wavelength=1560±10 nm,*

20 mmφ bending loss≦1 dB/m, cutoff wavelength≦1500 nm, and dispersion slope≦0.07 ps/nm²/km are regarded as preferable characteristic. Incidentally, the bending loss was measured as a loss which occurred when the optical fiber was bent to form a circular arc with a diameter of 20 mm, and this bending loss was made to be called "20 mmφ bending loss". The first profiles shown in FIGS. 1A and 1B were applied to the various kinds of prototype single mode optical fibers.

There were arranged six cases of FIGS. 5A to 5F with the average value $\Delta n_1$ of the relative refractive index difference of the inner core as a parameter. In the drawing, the symbol ○ represents a profile which satisfies the good characteristic, the symbol x represents a profile which the cutoff wavelength cannot satisfy the good characteristic, the symbol ● a profile which the zero-dispersion wavelength cannot satisfy the good characteristic, the symbol ▲ a profile which the MFD cannot satisfy the good characteristic, and the symbol ■ a profile which the dispersion slope cannot satisfy the good characteristic.

(1) In the case of $\Delta n_2/\Delta n_1 > 0.12$, in most of the profiles, the cutoff wavelength is above 1,500 nm, or the zero-dispersion wavelength does not take 1,560±10 nm.

On the contrary:

(2) In the case of $\Delta n_2/\Delta n_1 < 0.06$, there is a case where the MFD is less than 8 μmφ.
Therefore:

$0.06 \leq \Delta n_2/\Delta n_1 \leq 0.12$ is a preferable region.

In addition:

(3) In the case of 2a/2b>0.28, there is a case where the MFD is less than 8 μmφ or the dispersion slope is more than 0.07 ps/nm²/km.

On the contrary:

(4) In the case of 2a/2b<0.20, there is a case where the cutoff wavelength is above 1,500 nm or the MFD is less than 8 μmφ.
Therefore:

$0.20 \leq 2a/2b \leq 0.28$ is a preferable range.

Further: (5) In the case where the average value $\Delta n_1$ of the relative refractive index difference of the inner core is larger than 0.85% (see FIG. 5F), and when the average value $\Delta n_1$ of the relative refractive index difference of the inner core is smaller than 0.70% (see FIG. 4A), most of the profiles do not satisfy the standards even when the ratio $\Delta n_2/\Delta n_1$ of the average value of the relative refractive index difference of the outer core to the average value of the relative refractive index difference of the inner core and the ratio 2a/2b are within the aforementioned preferable ranges respectively. Therefore:

$0.70\% \leq \Delta n_1 \leq 0.85\%$ is a preferable range (see FIGS. 5B, 5C, 5D and 5E).

In conclusion from the above discussion, it is understood that:

$0.06 \leq \Delta n_2/\Delta n_1 \leq 0.12,$ $0.20 \leq 2a/2b \leq 0.28,$ and $0.70\% < \Delta n_1 < 0.85\%$ are preferable ranges.

EXAMPLE 2

Figure 6A:
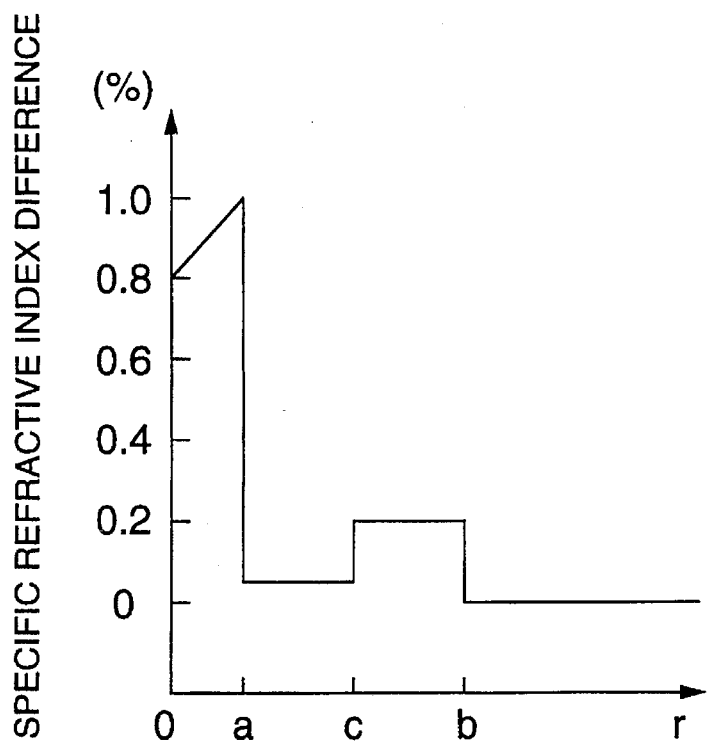
FIGS. 6A and 6B are explanatory diagrams for explaining a second profile.
Figure 6B:
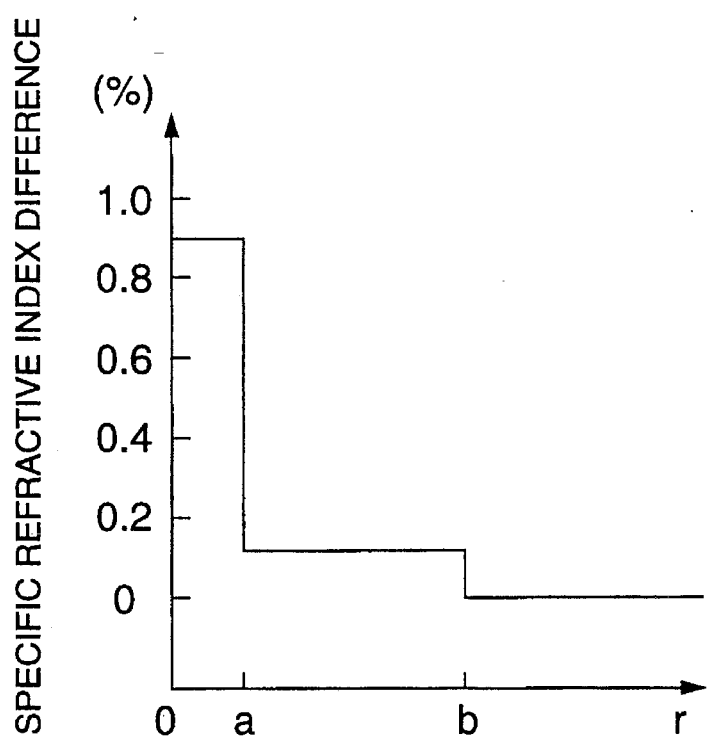

FIGS. 6A and 6B are explanatory diagrams for explaining a second profile. FIG. 6A is a diagram showing a second profile, and FIG. 6B is a diagram showing a comparative example. In this example, there is provided a region where the relative refractive index difference increases from the center toward the outside in both an inner core and an outer core.

As included in the good range for increasing MFD without increasing bending loss in the above description, the relations zero-dispersion wavelength=1560 nm and MFD=9.2 μmφ were established when the average value $\Delta n_1$ of the relative refractive index difference of the inner core was 0.9, the ratio $\Delta n_2/\Delta n_1$ of the average value of the relative refractive index difference of the outer core to the average value of the relative refractive index difference of the inner core was 0.13, and the ratio 2a/2b of the inner core diameter to the outer core diameter was 0.24.

In FIG. 6A, in the inner core, the relative refractive index difference Δn(r) increased in a straight line from the relative refractive index difference Δn(0)=0.8% at the fiber center to Δn(a)=1.0%. In the outer core, the relative refractive index difference Δn(r) took 0.06 from a to (a+b)/2, and 0.18 from (a+b)/2 to b. In a clad, the relative refractive index difference Δn(r) took 0%. The 20 mmφ bending loss became 3.4 dB/m.

FIG. 6B shows a profile where the relative refractive index difference is constant in both an inner core and an outer core. Under the condition of MFD=9.0 μmφ, 20 mmφ bending loss became 2.8 dB/m. If the ratio 2a/2b of the inner core diameter to the outer core diameter was changed, and the value of MFD=9.0 μmφ was set, the 20 mmφ bending loss became not less than 4 dB/m. Accordingly, the bending loss was advantageously smaller in the profile of FIG. 6A.

In FIG. 6A, the region where the relative refractive index difference increases from the center toward the outside may be provided in either the inner core or the outer core.

EXAMPLE 3

Figure 7:
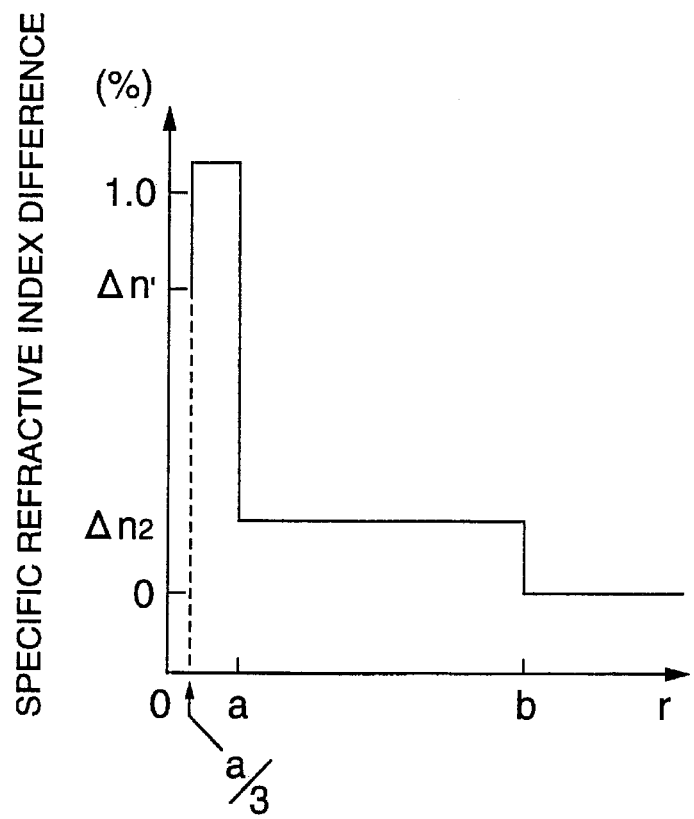
FIG. 7 is an explanatory diagram for explaining a third profile.

FIG. 7 is an explanatory diagram for explaining a third profile. In this example, a region where the relative refractive index difference increases from the center toward the outside is provided in an inner core.

As included in the good range for increasing MFD without increasing bending loss in the above description, the values of zero-dispersion wavelength=1560 nm, cutoff wavelength≦1500 nm and MFD=9.0 μmφ were established when the average value $\Delta n_1$ of the relative refractive index difference of the inner core was 0.73 to 1.1%, the ratio $\Delta n_2/\Delta n_1$ of the average value of the relative refractive index difference of the outer core to the average value of the relative refractive index difference of the inner core was 0.12 to 0.16, and the ratio 2a/2b of the inner core diameter to the outer core diameter was 0.21. In the inner core, the relative refractive index difference $\Delta n(r)$ took $\Delta n'$ from the fiber center to a/3, and 1.1 from a/3 to a, while $\Delta n_2$ in the outer core.

Figure 8:
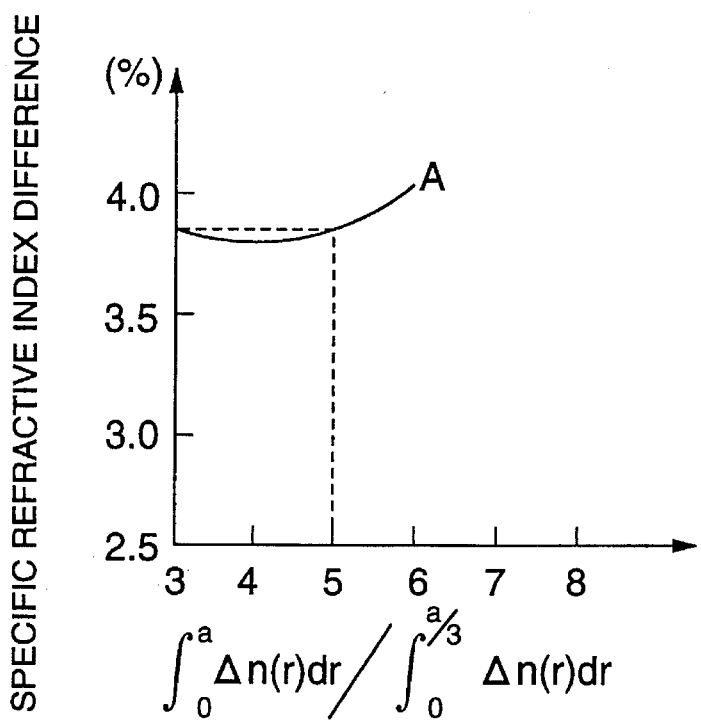
FIG. 8 is a diagram showing the characteristic of the third profile.

FIG. 8 is a diagram showing the characteristic of the third profile. There is shown a relationship between $(\int_0^a \Delta n(r)dr)/(\int_0^{a/3} \Delta n(r)dr)$ and 20 mmφ bending loss as $\Delta n'$ is varied. The case of $(\int_0^a \Delta n(r)dr)/(\int_0^{a/3} \Delta n(r)dr)=3$ means the case that the relative refractive index difference of the inner core takes a constant value of 1.1%. It is understood that the 20 mmφ bending loss can be advantageously reduced to 3.7 dB or less when this value is 3 to 5. It is the reason for no data in the right of the point A in FIG. 8 that there is no profile with MFD=9.0 μmφ when the zero-dispersion wavelength=1560 nm is established.

EXAMPLE 4

FIGS. 9A to 9F are diagrams illustrating a fourth profile. There is provided a region where the relative refractive index difference of an inner core or that of an outer core increases from the center toward the outside.

As included in the good range for increasing MFD without increasing dispersion slope in the above description, 2b was established so that the values of zero-dispersion wavelength=1560 nm and MFD=8.0 μmφ were established when the relative refractive index difference $\Delta n_1$ of the inner core was 0.8%, and the ratio 2a/2b of the inner core diameter to the outer core diameter was 0.24. Here, the width of the core diameter of the portion where the relative refractive index difference increases is r+, and the increment of the relative refractive index difference is $\Delta n+$.

In FIG. 9A, there is a region where the relative refractive index difference increases from the center toward the outside in the vicinity of the outer periphery of the inner core, with the width of the incremental region r+=0.04 b, and the increment of the relative refractive index difference $\Delta n+=0.23\%$. On the other hand, in FIG. 9B, there is a region where the relative refractive index difference increases in a straight line from the center toward the outside all over the inner core, with the width of the incremental region r+=0.22 b, and the increment of the relative refractive index difference $\Delta n+=0.16\%$. Because the line of the profile connecting the inner core and the outer core is inclined so that r+<a, the width does not take r+=0.24 b in spite of 2a/2b=0.24. While the dispersion slope took 0.0694 ps/nm²/km in the case where a profile as shown in FIG. 2A or 2B was adopted, the dispersion slope took 0.0685 to 0.0687 ps/nm²/km, that is, the dispersion slope could be reduced, in the case where a profile as shown in FIG. 9A or 9B was adopted. The characteristics of cutoff wavelength≦1500 nm, and 20 mmφ bending loss≦1 dB/m were maintained at this time, with the advantage of the reduction of the dispersion slope.

In FIG. 9C, there is a region where the refractive index increases from the center toward the outside all over the outer core, with the increment of the relative refractive index difference $\Delta n+=0.21\%$. In FIG. 9D, there is a region where the refractive index increases from the center toward the outside in an outside partial region of the outer core, with the width of the incremental region r+=0.45 b, and the increment of the relative refractive index difference $\Delta n+=0.34\%$. FIG. 9E shows a special embodiment of FIG. 9C, in which the relative refractive index difference becomes negative in an inside portion of an outer clad, with $\Delta n(a)=-0.06\%$, and the increment of the relative refractive index difference $\Delta n+=0.25\%$. While the dispersion slope took 0.0694 ps/nm²/km in the case where a profile as shown in FIG. 6A and 6B was adopted, the dispersion slope took 0.0678 to 0.0684 ps/nm²/km, that is, the dispersion slope could be reduced, in the case where a profile of the outer core as shown in FIG. 9C, 9D or 9E was adopted.

In any profile shown in FIGS. 9A to 9E, a region where the refractive index increases from the center toward the outside was provided at one place in either the inner core or the outer core. However, as shown previously in FIG. 6A, such a region where the relative refractive index difference increases from the center toward the outside may be provided in both the inner core and the outer core, for example, as shown in FIG. 9F in which FIGS. 9A and 9C are combined. Although both the increment of the relative refractive index difference in the inner core and the increment of the relative refractive index difference in the outer core are expressed by $\Delta n+$ in FIG. 9F, it is not always necessary to give them the same value. For example, the conditions are such that r+=0.04 b, $\Delta n+=0.15\%$ in the inner core, $\Delta n+32$ 0.20% in the outer core, $\Delta n(a) =0$, and $\Delta n(b)= 0.20\%$. Further, a plurality of incremental regions may be provided at desired places without distinction of the inner core and the outer core.

EXAMPLE 5

Figure 11A:
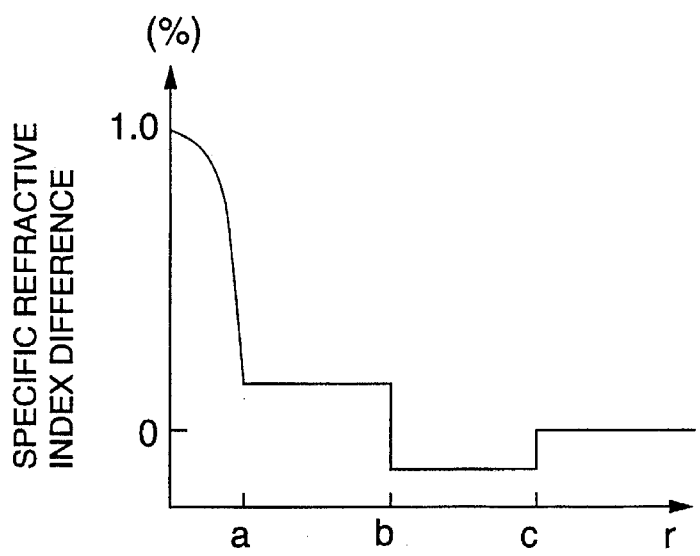
FIGS. 11A and 11B are explanatory diagrams for explaining a fifth profile.
Figure 11B:
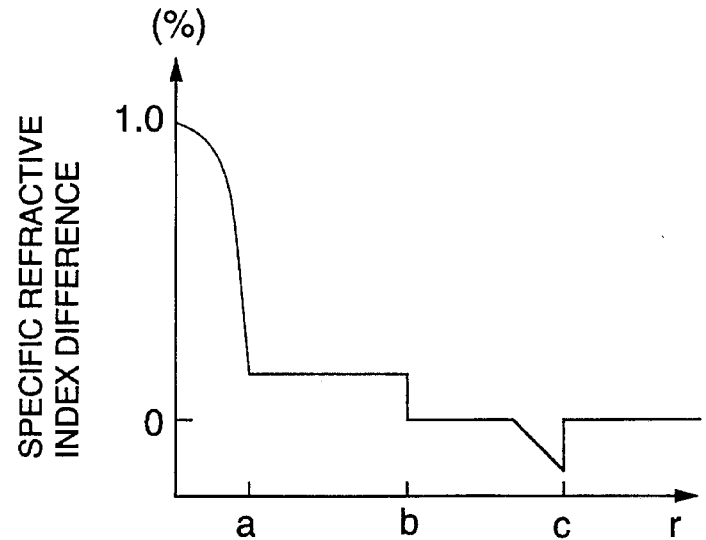

FIGS. 11A and 11B are explanatory diagrams for explaining a fifth profile. In FIG. 11A, an inner clad where the relative refractive index difference takes a constant negative value is provided between an outer core and a clad. In FIG. 11B, an inner clad where the relative refractive index difference $\Delta n(r)$ increases in the negative direction toward the outside is provided between an outer core and a clad. The outline of this profile has been described with FIG. 10. As included in the good range for increasing MFD without increasing dispersion slope in the above description, the values of zero-dispersion wavelength=1560 nm, MFD=8.0 μmφ, and cutoff wavelength≦1500 nm were established when $\Delta n_1$ was made 0.8%, the ratio $\Delta n_2/\Delta n_1$ of the average value of the relative refractive index difference of the outer core to the average value of the relative refractive index difference of the inner core was made 0.1, and the ratio 2a/2b of the inner core diameter to the outer core diameter was made 0.24.

In FIG. 11A, adopted is a profile where the outer diameter c of the inner clad is made 1.8 b, and the relative refractive index difference $\Delta n(r)$ takes a negative constant value between the outer diameter b of the outer core and the outer diameter c of the inner clad. In this region of the inner clad, when the integral value of the relative refractive index difference $\Delta n(r)$ was designated by S, the integral value S was set to the value of:

$$S = \int_b^c \Delta n(r) dr = -0.02 \; \mu m.$$

While the dispersion slope took not less than 0.066 ps/nm$^2$/km in the case where a profile having no inner clad as shown in FIG. 2A or 2B was adopted, the dispersion slope took 0.06 ps/nm$^2$/km in the minimum in the case where the above-mentioned profile of FIG. 11A was adopted, and as a result the dispersion slope could be more reduced in the case where the profile of FIG. 11A was adopted.

However, if the above-mentioned profile of FIG. 11A was adopted, the 20 mm$\phi$ bending loss was indeed put down to 1 dB/m or less, but it was about twice as large as that in the case where a profile as shown in FIG. 2A or 2B was adopted.

EXAMPLE 6

Figure 12:
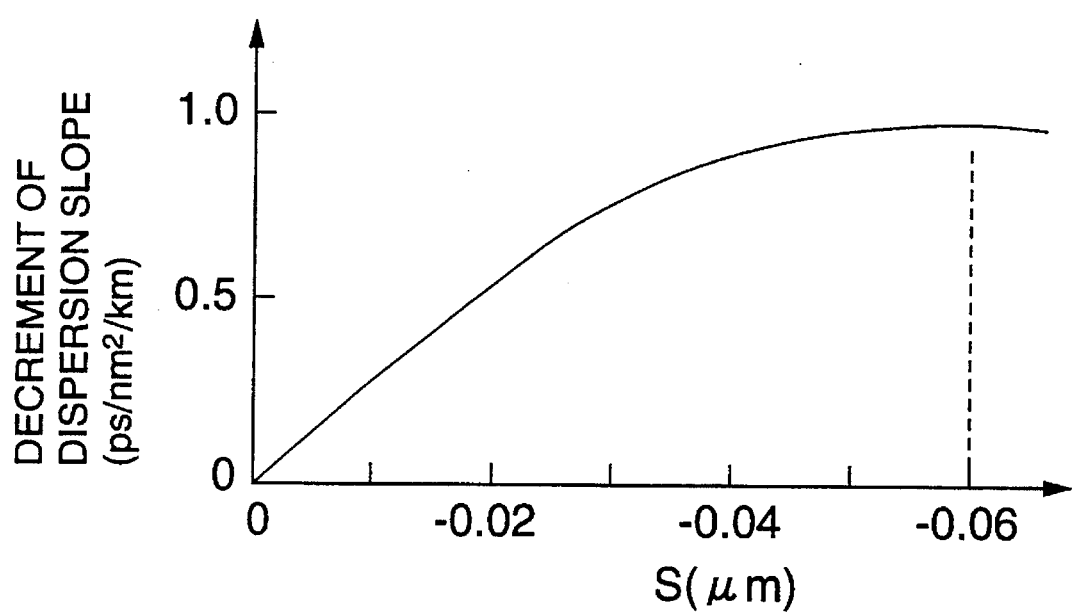
FIG. 12 is a diagram showing the characteristic of the fifth profile.

FIG. 12 is a diagram showing the characteristic of the fifth profile. This diagram shows the decrement of the dispersion slope relative to $S = \int_b^c \Delta n(r) dr$ which is an integral value of the relative refractive index difference $\Delta n(r)$, when $\Delta n_1 = 0.8\%$, MFD=8.0 $\mu m \phi$ and zero-dispersion wavelength=1560 nm. Here the decrement of the dispersion slope means the quantity of the dispersion slope with reference to the minimum value of the dispersion slope 0.066 ps/nm$^2$/km as 1 in the case where a profile having no inner clad with a minus relative refractive index difference as shown in FIGS. 2A and 2B is adopted.

As is apparent from FIG. 12, the decrement of the dispersion slope takes a peak with S=-0.06 $\mu m$, the bending loss increases in vain even if S is decreased to less than -0.06 $\mu m$. Therefore:

$$S \geq -0.06 \; \mu m$$

is a preferable range.

On the other hand, in FIG. 11B, the relative refractive index difference $\Delta n(r)$ decreases toward the outside in the region which occupies at least ⅓ of the width of the region of an inner clad in the outer circumferential part of the inner clad. In FIG. 11B, if the outer diameter of the inner clad is c=2b, and the integral value of the relative refractive index difference $\Delta n(r)$ in the inner clad region is S, the integral value S was set to the value of:

$$S = \int_b^c \Delta n(r) dr = -0.02 \; \mu m.$$

While the dispersion slope took not less than 0.066 ps/nm$^2$/km in the case where a profile as shown in FIG. 2A or 2B was adopted, the dispersion slope took 0.06 ps/nm$^2$/km in the minimum in either case where a profile as shown in FIG. 11A or 11B was adopted, and as a result the dispersion slope could be more reduced in the case where the profile of FIG. 11A or 11B was adopted.

While the 20 mm$\phi$ bending loss was 0.7 dB/m in the profile of FIG. 11A, it was 0.5 dB in the profile of FIG. 11B, smaller and more advantageous.

In the profile as shown in FIG. 11B, the relative refractive index difference $\Delta n(r)$ may decrease toward the outside in the region which occupies ⅓ or more of the width of the inner clad region and comes to the outside of the inner clad region.

Although the second and third profiles shown in FIGS. 6A, 6B and 7 were adopted in the good range for increasing MFD without increasing bending loss, and the fourth profile shown in FIG. 9 was adopted in the good range for increasing MFD without increasing dispersion slope, they can be adopted in either good range in the same manner as the first profile shown in FIGS. 2A and 2B.

Furthermore, the single mode optical fiber of the present invention satisfies the relations: $\Delta n_1 \geq 0.7\%$, $0.06 \leq \Delta n_2/\Delta n_1 \leq 0.16$, and $0.15 \leq 2a/2b \leq 0.3$ when $\Delta n_1$ and $\Delta n_2$ are expressed as follows: $\Delta n_1 = (n_2^2 - n_0^2)/2n_1^2$, and $\Delta n_2 = (n_2^2 - n_0^2)/2n_2^2$. In addition, it is preferable that the optical fiber satisfies the relation of $\Delta n_1 \leq 1.2\%$.

In the single mode optical fiber of the present invention, the MFD can be increased by increasing the specific refractive index $\Delta n_1$ of the inner core to reduce 2b/2a but without increase of bending loss. Further, in this profile, bending loss can be suppressed to a practically problemless level even in the case where the zero-dispersion wavelength is set to be longer. Further, the provision of a region in which the refractive index of the inner core increases from the center of the inner core toward the outside of the inner core, is effective for reduction of the dispersion slope.

On the assumption that the zero-dispersion wavelength and the MFD take constant values respectively, bending loss is reduced by increasing $\Delta n_1$ in the condition in which $\Delta n_2/\Delta n_1$ is in a range of from 0.06 to 0.16. This is because structural dispersion is increased to thereby make the zero-dispersion wavelength large when, for example, the quantity of GeO$_2$ with which the core portion is doped is increased in order to increase $\Delta n_1$, so that the practical zero-dispersion wavelength for one and the same MFD can be shifted to a region small in bending loss.

When $\Delta n_1$ is increased, however, the dispersion slope showing the change of the dispersion value with respect to the wavelength is increased to narrow the range of the zero-dispersion wavelength permitted to the optical fiber line, so that the narrowing of the range may become a problem. It is therefore effective that $\Delta n_1$ satisfies the relation $\Delta n_1 \leq 1.2\%$ in order to obtain the practical dispersion slope ($\leq 0.1$ ps/nm$^2$/km).

Further, when as the profile of the inner core there is a portion in which the refractive index increases from the center of the inner core to the outside, the zero-dispersion wavelength in a region of large core diameter b becomes shorter than that of an optical fiber having the same core diameter (a, b) and the same specific refractive index $\Delta n_1$, $\Delta n_2$. In this occasion, transmission characteristic such as MFD, cutoff wavelength, etc. little changes, so that only the zero-dispersion wavelength can be shifted to the long wavelength side selectively. This arises a merit that the dispersion slope can be set to be smaller to obtain a predetermined range of zero-dispersion wavelength, MFD and cutoff wavelength compared with the profile in which the refractive index of the inner core is constant or decreases uniformly as from the center of the inner core toward the outer core.

EXAMPLE 7

Various kinds of prototype single mode optical fibers were manufactured and the characteristics thereof were examined. As for the aforementioned respective characteristic values, measurement results are shown in FIGS. 13A to 13E upon the assumption that the characteristic having the following values MFD≧8 μm,

*zero-dispersion wavelength*=1560±5 nm, 20 mmφ bending loss≦0.02 dB/m, and cutoff wavelength≦1550 nm is regarded as preferable characteristic. Incidentally, the bending loss was measured as a loss which occurred when the optical fiber was bent to form a circular arc with a diameter of 20 mm, and this bending loss was made to be called "20 mmφ bending loss".

There were arranged five cases as shown in FIGS. 13A to 13E with $\Delta n_2/\Delta n_1$ as a parameter. In the drawings, the symbol x represents a profile which cannot satisfy the aforementioned good characteristic, and the symbol o represents a profile which satisfies the good characteristic.

Figure 13C:
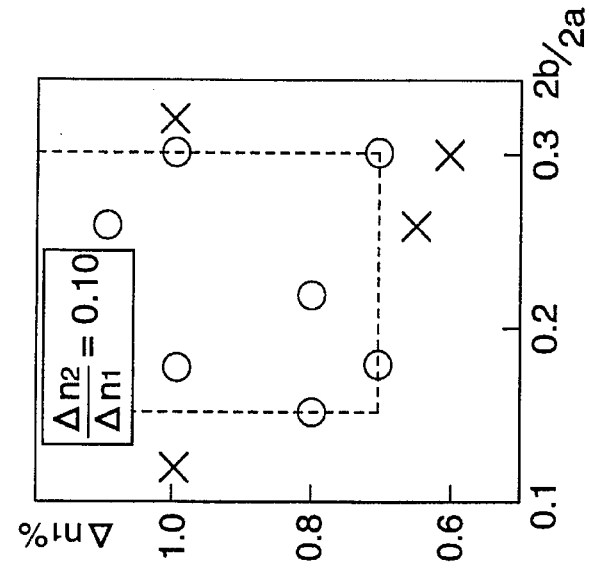
Figure 13B:
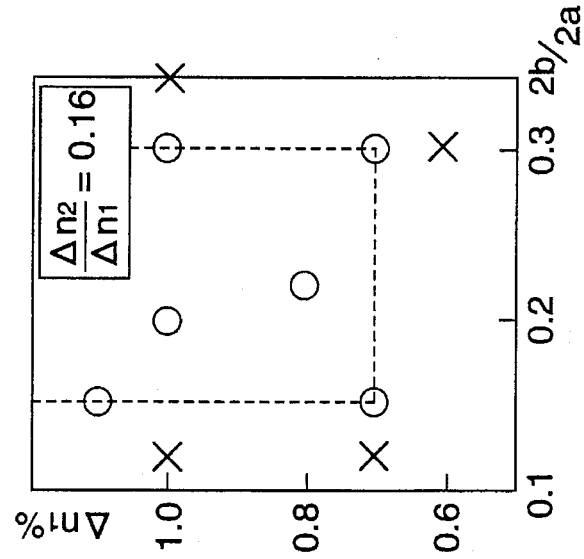
Figure 13A:
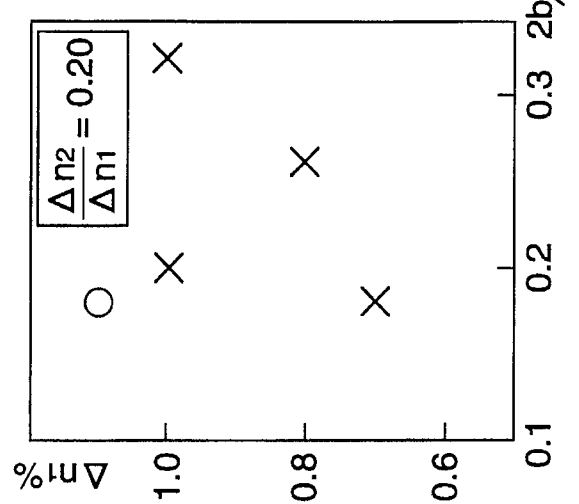

(1) In the case of $\Delta n_2/\Delta n_1 > 0.16$ (see FIG. 13A), cutoff wavelength is over 1,550 nm in most of the profiles.
On the contrary:

(2) In the case of $\Delta n_2/\Delta n_1 < 0.06$ (see FIG. 13E), 20 mmφ bending loss is not less than 2 dB/m.
Therefore:

$0.06 \leq \Delta n_2/\Delta n_1 \leq 0.16$ is a preferable region (see the FIGS. 13B, 13C and 13D).
In the case of $0.06 \leq \Delta n_2/\Delta n_1 \leq 0.16$:

(3) 20 mmφ bending loss≧0.2 dB/m when 2a/2b>0.3; and (4) cutoff wavelength is longer than 1,550 nm when 2a/2b≦ 0.15.
Therefore:

$0.15 \leq 2a/2b \leq 0.4$ is a preferable range (see the diagrams FIGS. 13B, 13C and 13D).

Further, it was found that:

(5) when $\Delta n_1 < 0.7\%$, there is no profile in which MFD, bending loss and zero-dispersion wavelength are all good.
Therefore, it is understood that:

$0.06 \leq \Delta n_2/\Delta n_1 \leq 0.16$ $0.15 \leq 2a/2b \leq 0.3$ $\Delta n_1 \geq 0.7\%$ are preferable ranges.

Since a normal transmission system can be used satisfyingly even if:

MFD<8.0 μm there is a profile satisfying the bending loss characteristic even if:

$\Delta n_1 < 0.7\%$

However, in the case of a high-speed digital transmission optical fiber, particularly in the case that the product of a bit rate and optical fiber length is above $5 \times 10^{12}$ Hz.km, a profile in the aforementioned range is available.

FIGS. 2A and 2B are diagrams illustrating the refractive index distribution of a core portion of a conventional single mode optical fiber. In a profile of an inner core, as illustrated, the refractive index is constant, or decreases uniformly from the center toward the inner core.

FIGS. 14A and 14B are diagrams illustrating the refractive index distribution applied to a single mode optical fiber in this example. The refractive index of an inner core has an area in which the refractive index increases from the center toward the outside.

The refractive index distribution of the inner core was also examined. With a profile in the aforementioned region by which good characteristics can be obtained, dispersion slope obtained was about 10% smaller in the case of adopting a profile of an inner core as shown in FIGS. 14A and 14B having an area where the refractive index increases from the center toward the outside, than in the case of adopting a profile of an inner core as shown in FIGS. 2A and 2B, even if they have the same MFD, zero-dispersion wavelength and bending loss characteristic. FIG. 15 shows transmission characteristics in the case of adopting the profiles of FIGS. 2B and 14B.

From these results, in the present invention, it is understood that it is advantageous that the refractive index of an inner core has an area where the refractive index increases from the core center toward the outside. This result can be also obtained when an outer core has a portion where the refractive index increases from the center toward the outside (clad).

What is claimed is:

1. A single mode optical fiber comprising:
    an inner core portion having a diameter of 2a and a refractive index $n_1$;
    an outer core portion having a diameter of 2b and a refractive index $n_2$ which is smaller than the refractive index $n_1$ of said inner core portion, said outer core being disposed around said inner core;
    a clad portion disposed around said outer core portion, which has a refractive index $n_0$,
    wherein said single mode optical fiber satisfies relations of:

$0.70\% \leq \Delta n_1 \leq 1.2\%$, $0.12 \leq \Delta n_2/\Delta n_1 \leq 0.16$, and $0.15 \leq 2a/2b \leq 0.25$ where $\Delta n_1=(n_1^2-n_0^2)/n_1^2$, and $\Delta n_2=(n_2^2-n_0^2)/n_2^2$.

2. A single mode optical fiber as claimed in claim 1, wherein said single mode optical fiber has at least one region in which the relative refractive index difference of at least of one of said inner core and said outer core increases from the core center toward the outside.

3. A single mode optical fiber as claimed in claim 2, wherein a center portion of said inner core has a concave portion of $\Delta n(r)$ which satisfies a relation of:

$\int_0^a \Delta n(r)dr \leq 5\int_0^{a/3} \Delta n(r)dr$ where $\Delta n(r)$ designates a relative refractive index difference in a portion at a distance r from the center of said optical fiber.

4. A single mode optical fiber as claimed in claim 1, wherein a mode field diameter of said optical fiber is larger than 9 μm.

5. A single mode optical fiber comprising:
    an inner core portion having a diameter of 2a and a refractive index $n_1$;
    an outer core portion having a diameter of 2b and a refractive index $n_2$ which is smaller than the refractive index $n_1$ of said inner core portion, said outer core being disposed around said inner core;

a clad portion disposed around said outer core portion, which has a refractive index $n_0$, wherein said single mode optical fiber satisfies relations of:

$$0.70\% \leq \Delta n_1 \leq 0.85\%,$$

$$0.06 \leq \Delta n_2/\Delta n_1 \leq 0.12, \text{ and}$$

$$0.20 \leq 2a/2b \leq 0.28$$

where $\Delta n_1 = (n_1^2 - n_0^2)/n_1^2$, and $\Delta n_2 = (n_2^2 - n_0^2)/n_2^2$.

6. A single mode optical fiber as claimed in claim 5, wherein said single mode optical fiber has at least one region in which the relative refractive index difference of at least of one of said inner core and said outer core increases from the core center toward the outside.

7. A single mode optical fiber as claimed in claim 6, wherein a center portion of said inner core has a concave portion of $\Delta n(r)$ which satisfies a relation of:

$$\int_0^a \Delta n(r) dr \leq 5 \int_0^{a/3} \Delta n(r) dr$$

where $\Delta n(r)$ designates a relative refractive index difference in a portion at a distance r from the center of said optical fiber.

8. A single mode optical fiber as claimed in claim 5, further comprising an inner clad region in which an average value $\Delta n_0'$ of relative refractive index difference is negative, said inner clad region being provided between said outer core and said clad.

9. A single mode optical fiber as claimed in claim 8, wherein said inner clad having a diameter 2c, said inner clad satisfying the relation of:

$$3b \leq 2c \leq 9b, \text{ and}$$

the value of S defined by the expression of:

$$S = \int_b^c \Delta n(r) dr$$

satisfies the relation of:

$$S \geq 0.06 \text{ } \mu m$$

where $\Delta n(r)$ designates the relative refractive index difference at a position of distance n from the center of the optical fiber.

10. A single mode optical fiber as claimed in claim 8, wherein the specific refractive index decreases toward the outside in the region which occupies at least ⅓ of the width of said inner clad region on the outer portion of said inner clad region.

11. A single mode optical fiber as claimed in claim 5, wherein a mode field diameter of said optical fiber is larger than 8 μm.

12. A single mode optical fiber comprising:

an inner core portion having a diameter of 2a and a refractive index $n_1$;

an outer core portion having a diameter of 2b and a refractive index $n_2$ which is smaller than the refractive index $n_1$ of said inner core portion, said outer core being disposed around said inner core;

a clad portion disposed around said outer core portion, which has a refractive index $n_0$, wherein said single mode optical fiber satisfies relations of:

$$\Delta n_1 \geq 0.7\%,$$

$$0.06 \leq \Delta n_2/\Delta n_1 \leq 0.16, \text{ and}$$

$$0.15 \leq 2a/2b \leq 0.3$$

where $\Delta n_1 = (n_1^2 - n_0^2)/n_1^2$, and $\Delta n_2 = (n_2^2 - n_0^2)/n_2^2$.

13. A single mode optical fiber as claimed in claim 12, wherein said single mode optical fiber satisfies the relation of: $\Delta n_1 \leq 1.2\%$.

14. A single mode optical fiber as claimed in claim 12, wherein said single mode optical fiber has a region in which the refractive index of said inner core increases from the center of said inner core toward the outside of said inner core.

15. A single mode optical fiber as claimed in claim 12, wherein a mode field diameter of said optical fiber is larger than 8 μm.

* * * * *